US012631820B2

(12) United States Patent
Tsai et al.

(10) Patent No.: US 12,631,820 B2
(45) Date of Patent: May 19, 2026

(54) SILICON-BASED PHOTONIC QUANTUM MEMORY DEVICES AND METHODS FOR FORMING THE SAME

(71) Applicant: Taiwan Semiconductor Manufacturing Company Limited, Hsinchu (TW)

(72) Inventors: Chung-Hao Tsai, Huatan Township (TW); Ching-Ho Chin, Chung-Li City (TW); Wei-Ting Chen, Tainan City (TW); Chuei-Tang Wang, Taichung City (TW); Chen-Hua Yu, Hsinchu City (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 544 days.

(21) Appl. No.: 18/326,038

(22) Filed: May 31, 2023

(65) Prior Publication Data

US 2024/0402423 A1 Dec. 5, 2024

(51) Int. Cl.
*G02B 6/122* (2006.01)
*G02B 6/12* (2006.01)
*G06N 10/40* (2022.01)

(52) U.S. Cl.
CPC ....... *G02B 6/1223* (2013.01); *G02B 6/12007* (2013.01); *G06N 10/40* (2022.01); *G02B 2006/12061* (2013.01); *G02B 2006/12145* (2013.01)

(58) Field of Classification Search
CPC ... G02B 6/1223; G02B 6/12007; G06N 10/40
See application file for complete search history.

(56) References Cited

U.S. PATENT DOCUMENTS

2009/0263076 A1* 10/2009 Mathai ............... G02B 6/12007
385/32

* cited by examiner

*Primary Examiner* — Michael P Mooney
(74) *Attorney, Agent, or Firm* — The Marbury Law Group, PLLC

(57) ABSTRACT

A quantum memory device includes: a waveguide configured to spatially confine paths of photons therein; a memory cell that includes a micro-ring resonator (MRR), a frequency tuner, and a quantum memory material portion, wherein the MRR includes a first segment that is parallel to a segment of the waveguide, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and located within or on a third segment of the MRR; and a control circuit configured to modulate the photon resonance wavelength in the MRR during a first step of a photon capture operation to match a predefined wavelength, and to generate captured photons in the MRR.

20 Claims, 24 Drawing Sheets

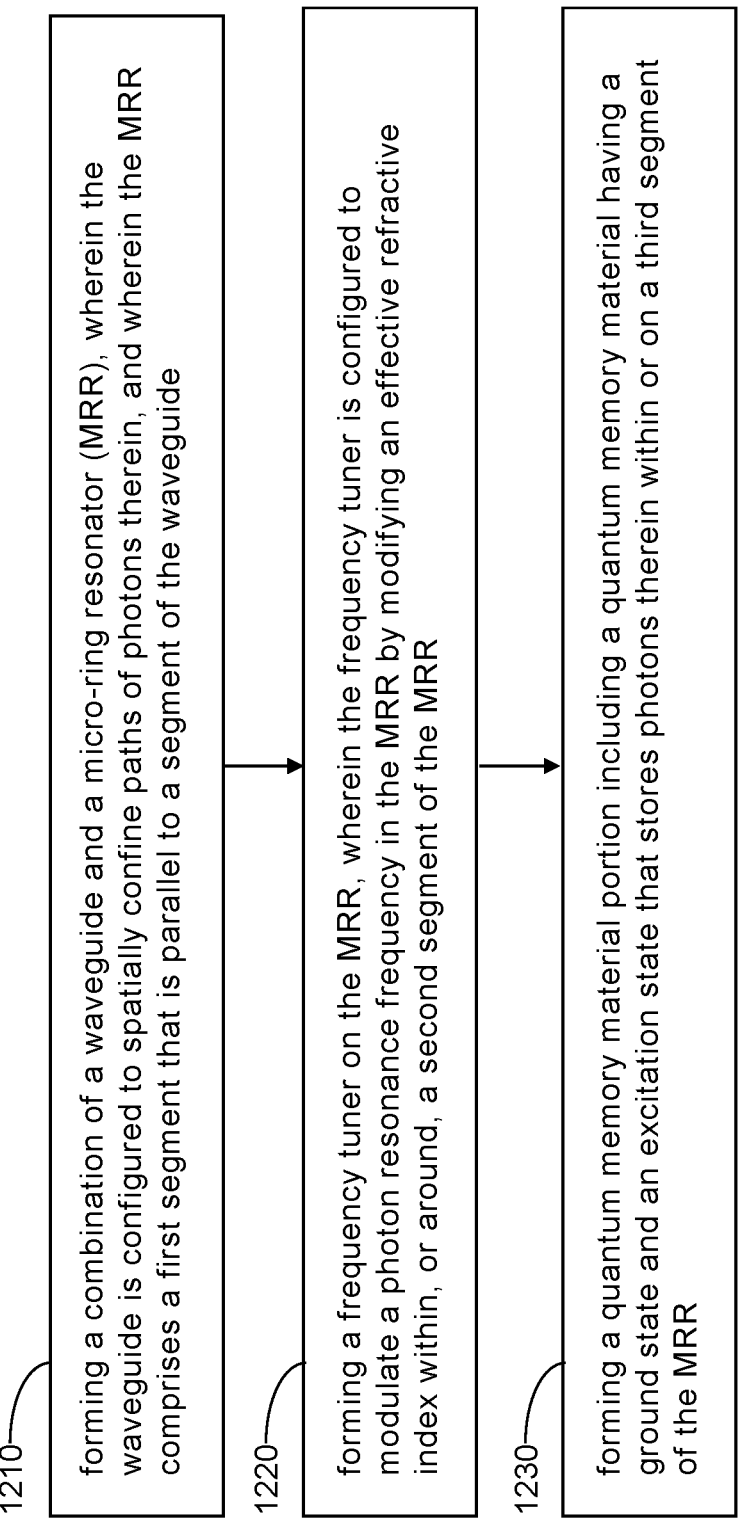

1210 — forming a combination of a waveguide and a micro-ring resonator (MRR), wherein the waveguide is configured to spatially confine paths of photons therein, and wherein the MRR comprises a first segment that is parallel to a segment of the waveguide 1220 — forming a frequency tuner on the MRR, wherein the frequency tuner is configured to modulate a photon resonance frequency in the MRR by modifying an effective refractive index within, or around, a second segment of the MRR 1230 — forming a quantum memory material portion including a quantum memory material having a ground state and an excitation state that stores photons therein within or on a third segment of the MRR

FIG. 12

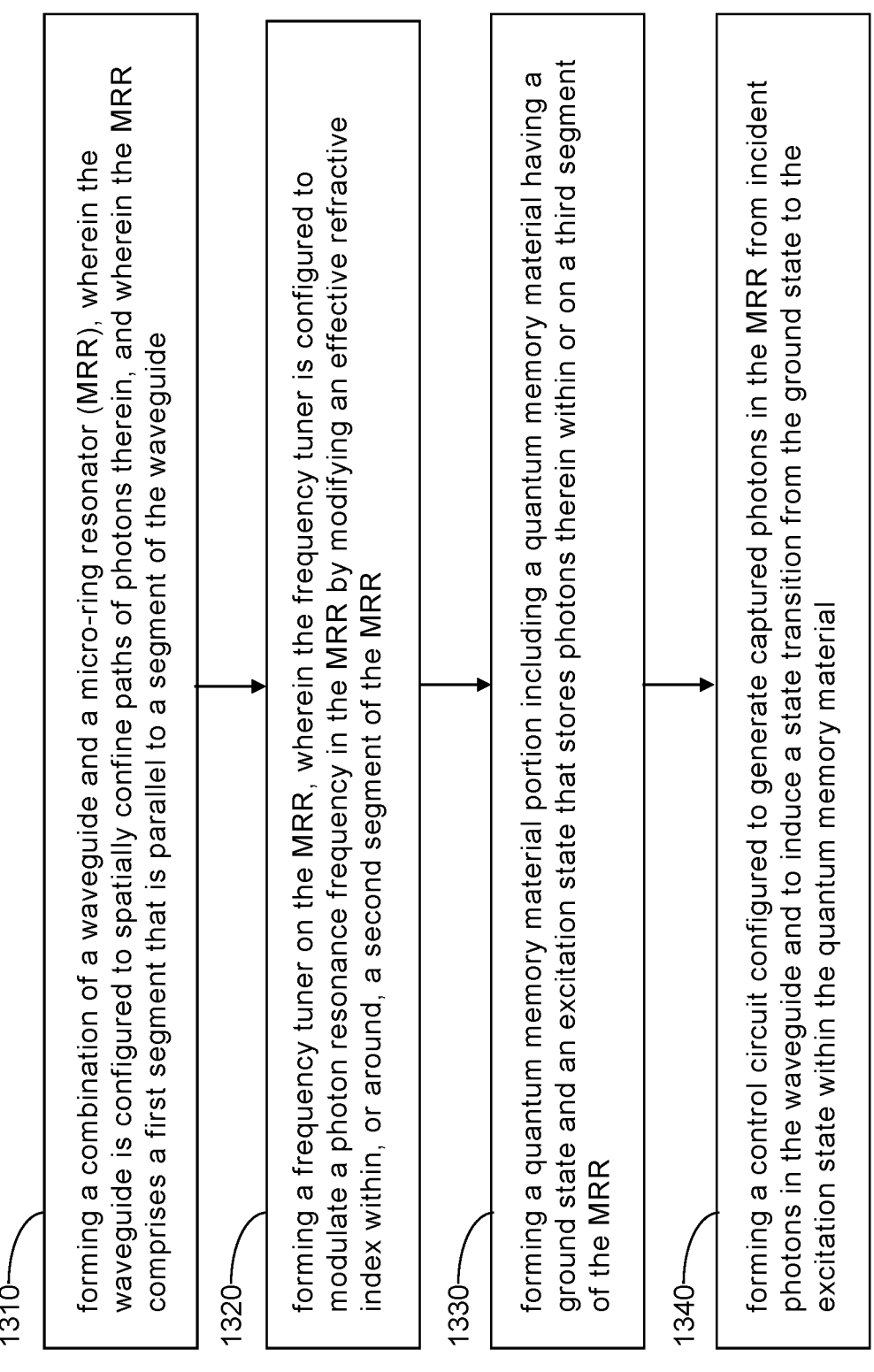

1310 — forming a combination of a waveguide and a micro-ring resonator (MRR), wherein the waveguide is configured to spatially confine paths of photons therein, and wherein the MRR comprises a first segment that is parallel to a segment of the waveguide 1320 — forming a frequency tuner on the MRR, wherein the frequency tuner is configured to modulate a photon resonance frequency in the MRR by modifying an effective refractive index within, or around, a second segment of the MRR 1330 — forming a quantum memory material portion including a quantum memory material having a ground state and an excitation state that stores photons therein within or on a third segment of the MRR 1340 — forming a control circuit configured to generate captured photons in the MRR from incident photons in the waveguide and to induce a state transition from the ground state to the excitation state within the quantum memory material

FIG. 13

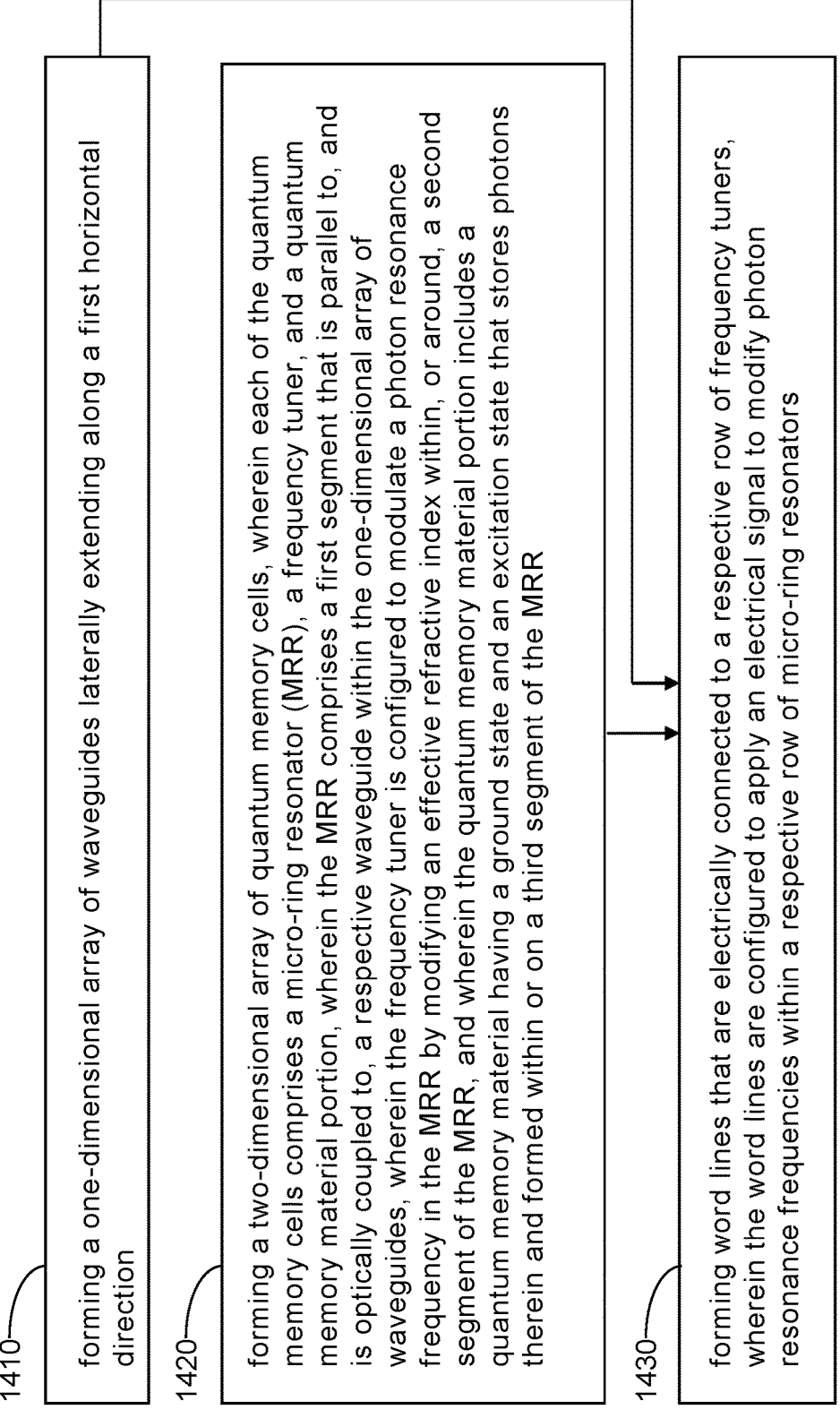

1410 — forming a one-dimensional array of waveguides laterally extending along a first horizontal direction 1420 — forming a two-dimensional array of quantum memory cells, wherein each of the quantum memory cells comprises a micro-ring resonator (MRR), a frequency tuner, and a quantum memory material portion, wherein the MRR comprises a first segment that is parallel to, and is optically coupled to, a respective waveguide within the one-dimensional array of waveguides, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and formed within or on a third segment of the MRR 1430 — forming word lines that are electrically connected to a respective row of frequency tuners, wherein the word lines are configured to apply an electrical signal to modify photon resonance frequencies within a respective row of micro-ring resonators

FIG. 14

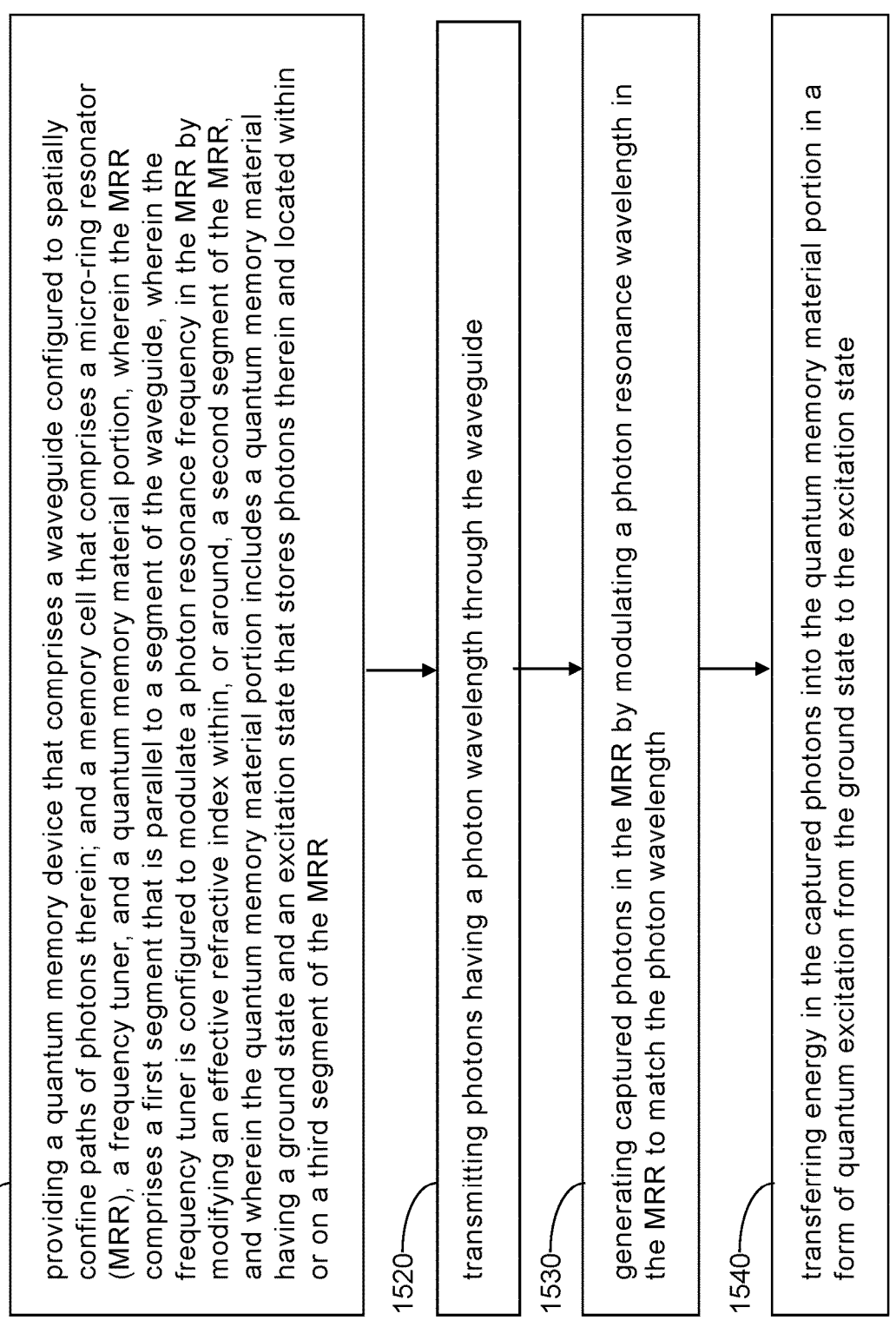

1510 — providing a quantum memory device that comprises a waveguide configured to spatially confine paths of photons therein; and a memory cell that comprises a micro-ring resonator (MRR), a frequency tuner, and a quantum memory material portion, wherein the MRR comprises a first segment that is parallel to a segment of the waveguide, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and located within or on a third segment of the MRR 1520 — transmitting photons having a photon wavelength through the waveguide 1530 — generating captured photons in the MRR by modulating a photon resonance wavelength in the MRR to match the photon wavelength 1540 — transferring energy in the captured photons into the quantum memory material portion in a form of quantum excitation from the ground state to the excitation state

FIG. 15

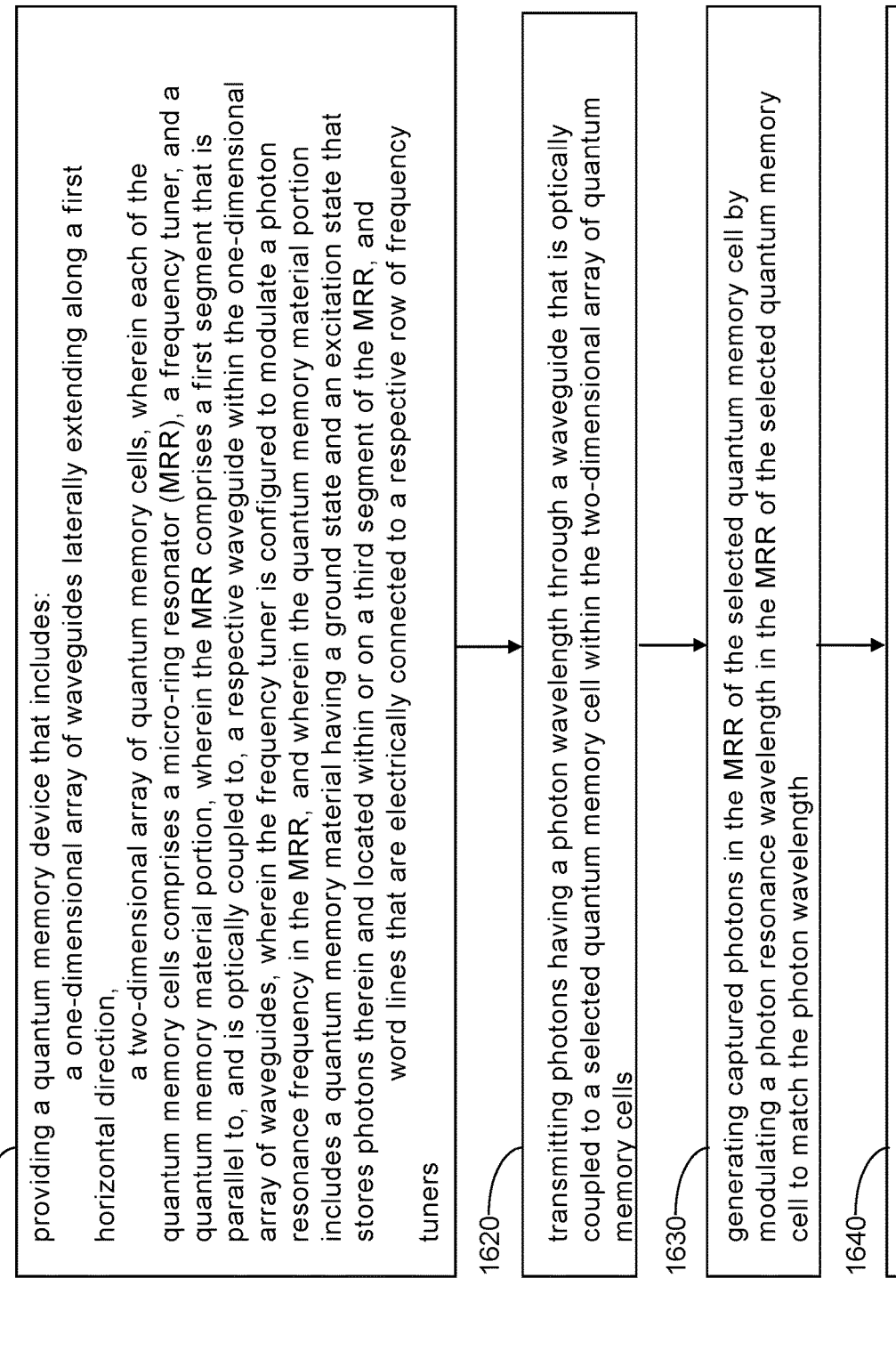

1610 — providing a quantum memory device that includes:

a one-dimensional array of waveguides laterally extending along a first horizontal direction, a two-dimensional array of quantum memory cells, wherein each of the quantum memory cells comprises a micro-ring resonator (MRR), a frequency tuner, and a quantum memory material portion, wherein the MRR comprises a first segment that is parallel to, and is optically coupled to, a respective waveguide within the one-dimensional array of waveguides, wherein the frequency tuner is configured to modulate a photon resonance frequency in the MRR, and wherein the quantum memory material portion includes a quantum memory material having a ground state and an excitation state that stores photons therein and located within or on a third segment of the MRR, and word lines that are electrically connected to a respective row of frequency tuners 1620 — transmitting photons having a photon wavelength through a waveguide that is optically coupled to a selected quantum memory cell within the two-dimensional array of quantum memory cells 1630 — generating captured photons in the MRR of the selected quantum memory cell by modulating a photon resonance wavelength in the MRR of the selected quantum memory cell to match the photon wavelength 1640 — transferring energy in the captured photons into the quantum memory material portion of the selected quantum memory cell in a form of quantum excitation

FIG. 16

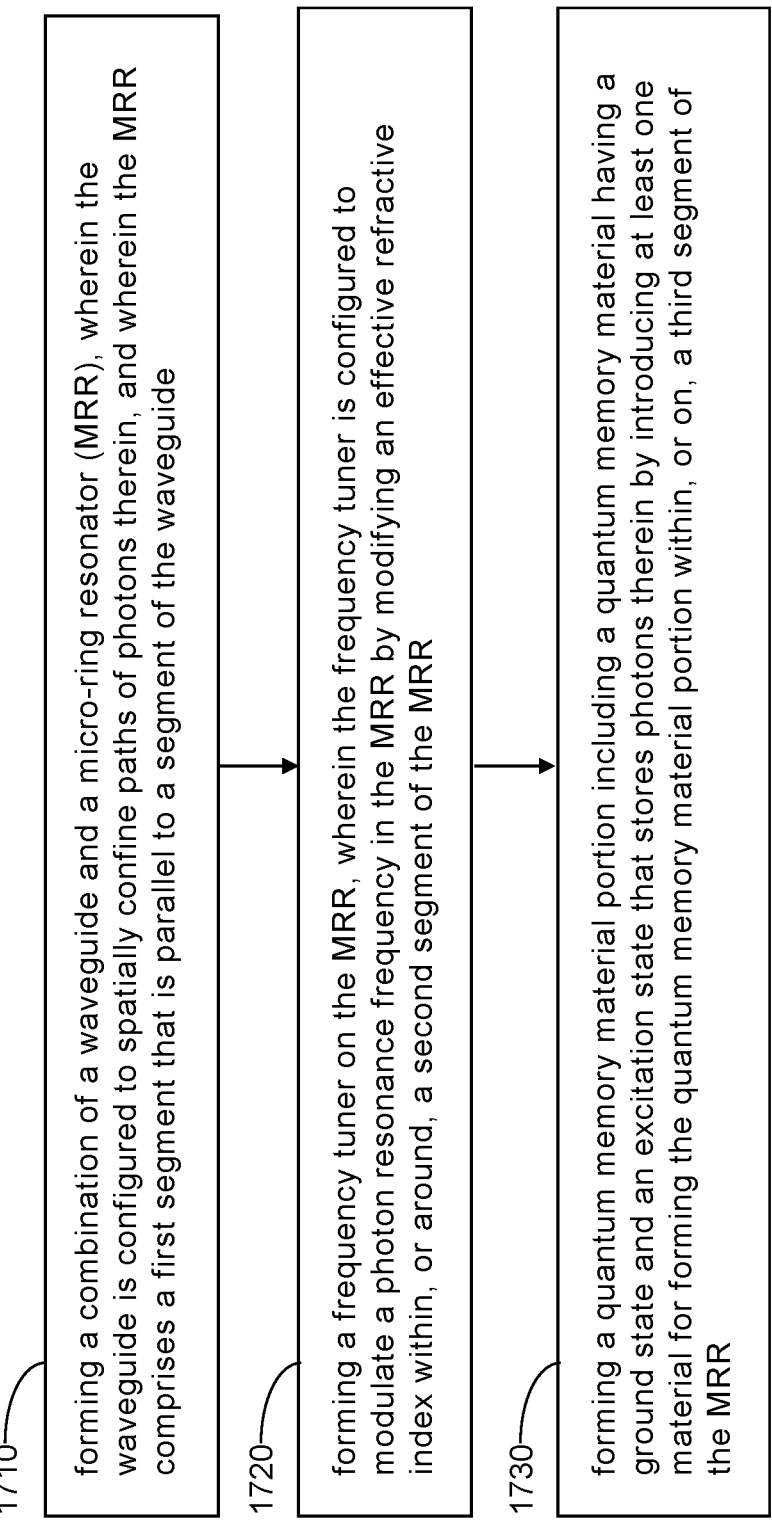

1710 — forming a combination of a waveguide and a micro-ring resonator (MRR), wherein the waveguide is configured to spatially confine paths of photons therein, and wherein the MRR comprises a first segment that is parallel to a segment of the waveguide 1720 — forming a frequency tuner on the MRR, wherein the frequency tuner is configured to modulate a photon resonance frequency in the MRR by modifying an effective refractive index within, or around, a second segment of the MRR 1730 — forming a quantum memory material portion including a quantum memory material having a ground state and an excitation state that stores photons therein by introducing at least one material for forming the quantum memory material portion within, or on, a third segment of the MRR

FIG. 17

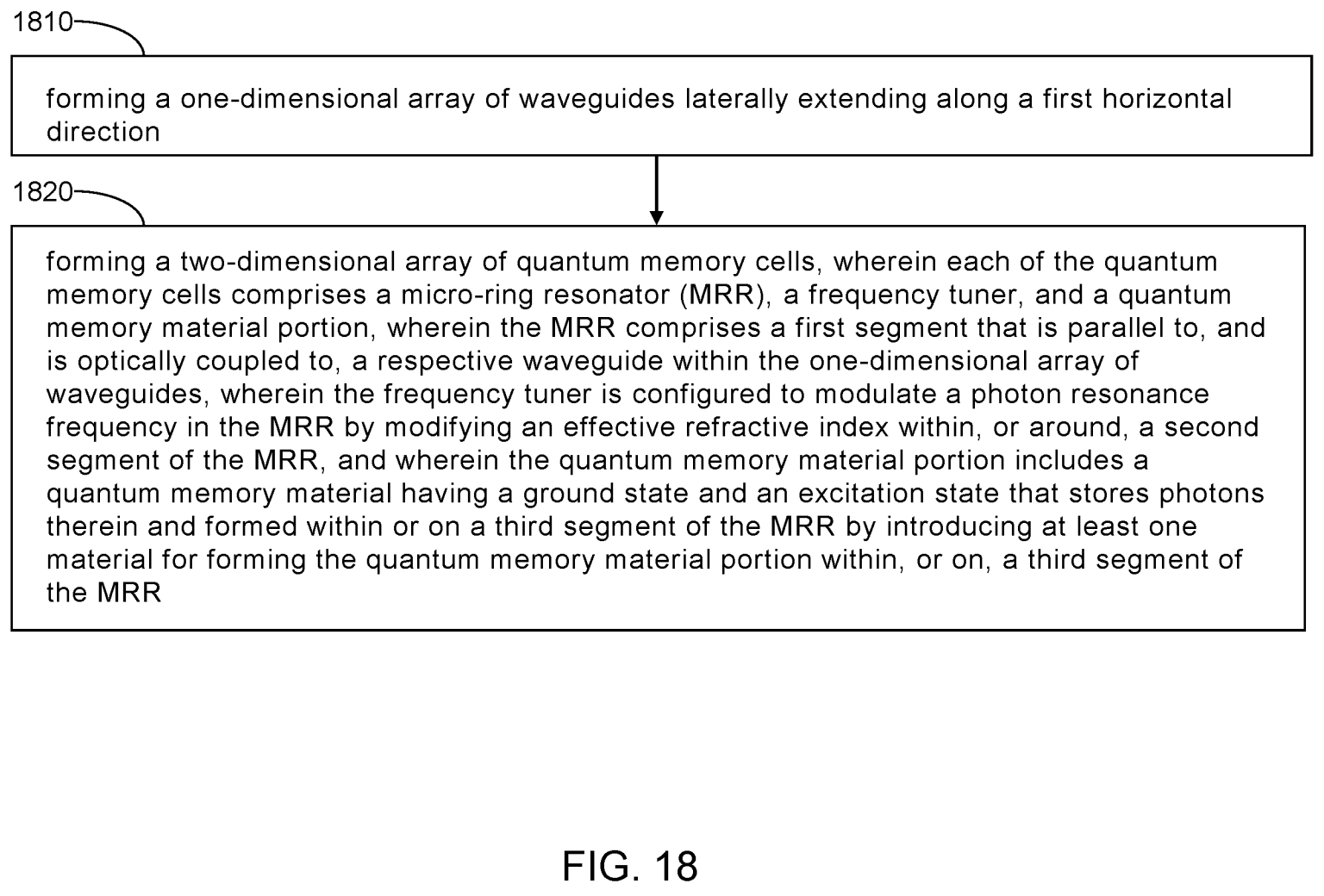

1810 — forming a one-dimensional array of waveguides laterally extending along a first horizontal direction 1820 — forming a two-dimensional array of quantum memory cells, wherein each of the quantum memory cells comprises a micro-ring resonator (MRR), a frequency tuner, and a quantum memory material portion, wherein the MRR comprises a first segment that is parallel to, and is optically coupled to, a respective waveguide within the one-dimensional array of waveguides, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and formed within or on a third segment of the MRR by introducing at least one material for forming the quantum memory material portion within, or on, a third segment of the MRR

FIG. 18

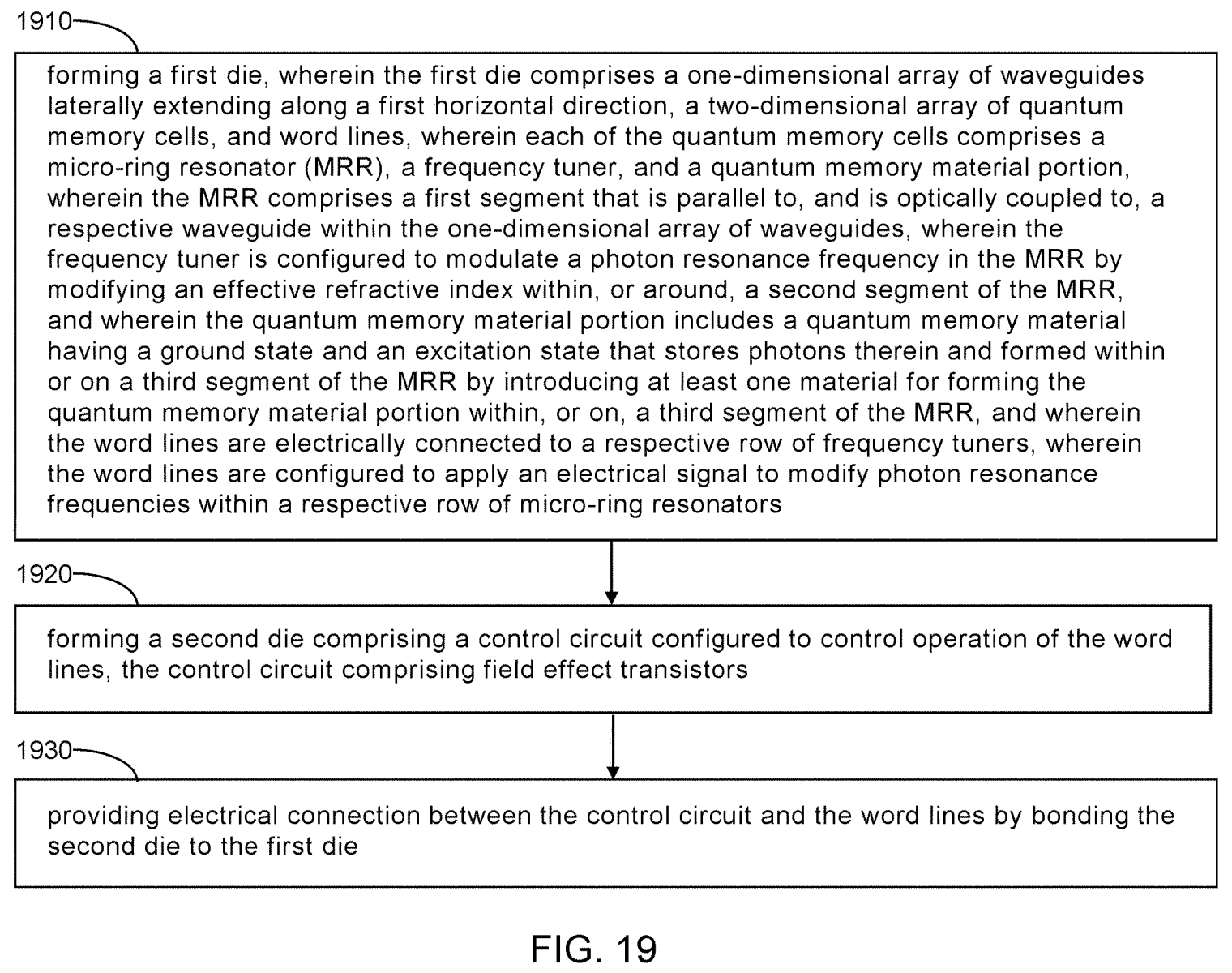

1910 — forming a first die, wherein the first die comprises a one-dimensional array of waveguides laterally extending along a first horizontal direction, a two-dimensional array of quantum memory cells, and word lines, wherein each of the quantum memory cells comprises a micro-ring resonator (MRR), a frequency tuner, and a quantum memory material portion, wherein the MRR comprises a first segment that is parallel to, and is optically coupled to, a respective waveguide within the one-dimensional array of waveguides, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and formed within or on a third segment of the MRR by introducing at least one material for forming the quantum memory material portion within, or on, a third segment of the MRR, and wherein the word lines are electrically connected to a respective row of frequency tuners, wherein the word lines are configured to apply an electrical signal to modify photon resonance frequencies within a respective row of micro-ring resonators 1920 — forming a second die comprising a control circuit configured to control operation of the word lines, the control circuit comprising field effect transistors 1930 — providing electrical connection between the control circuit and the word lines by bonding the second die to the first die

FIG. 19

SILICON-BASED PHOTONIC QUANTUM MEMORY DEVICES AND METHODS FOR FORMING THE SAME

BACKGROUND

Quantum information storage and communication have the potential for enabling faster secure communication. However, existing quantum storage architectures often require cryogenic temperatures and complex system support setups such as vacuum environment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12 is a first flow chart that illustrates a sequence of processing steps that may be used to manufacture a quantum memory device according to an embodiment of the present disclosure.

FIG. 13 is a second flow chart that illustrates a sequence of processing steps that may be used to manufacture a quantum memory device according to an embodiment of the present disclosure.

FIG. 14 is a third flow chart that illustrates a sequence of processing steps that may be used to manufacture a quantum memory device according to an embodiment of the present disclosure.

FIG. 15 is a fourth flow chart that illustrates a sequence of processing steps that may be used to operate a quantum memory device according to an embodiment of the present disclosure.

FIG. 16 is a fifth flow chart that illustrates a sequence of processing steps that may be used to operate a quantum memory device according to an embodiment of the present disclosure.

FIG. 17 is a sixth flow chart that illustrates a sequence of processing steps that may be used to manufacture a quantum memory device according to an embodiment of the present disclosure.

FIG. 18 is a seventh flow chart that illustrates a sequence of processing steps that may be used to manufacture a quantum memory device according to an embodiment of the present disclosure.

FIG. 19 is an eighth flow chart that illustrates a sequence of processing steps that may be used to manufacture a quantum memory device according to an embodiment of the present disclosure.

DETAILED DESCRIPTION

Figures 1A, 1B, 1C:
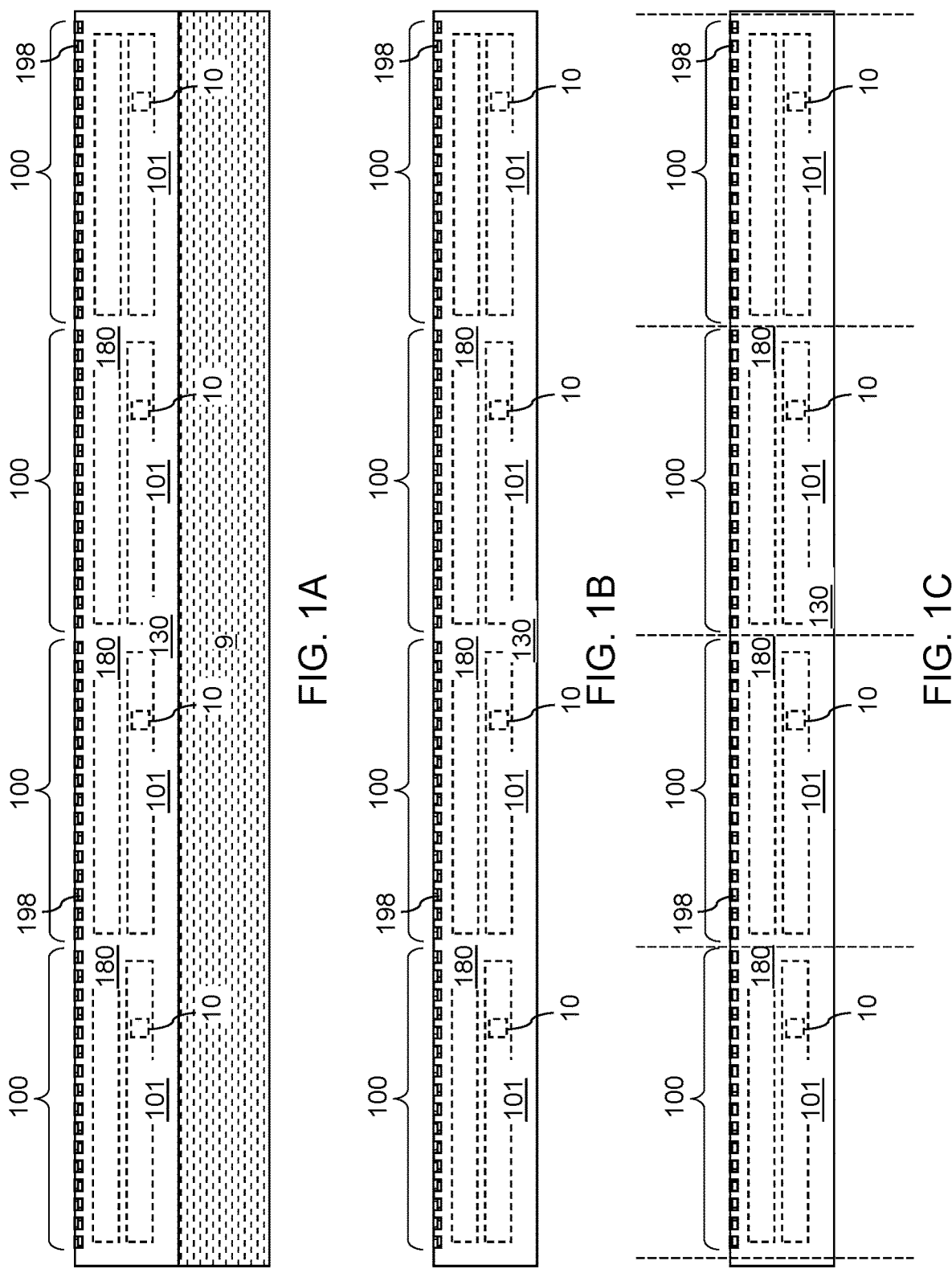
FIGS. 1A-1C illustrate a manufacturing process for forming first dies according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise. As used herein, an element or a system "configured for" a function or an operation or "configured to" provide or perform a function or an operation refers to an element or a system that is provided with hardware, and with software as applicable, to enable such a function or such an operation as described in the present disclosure, and as known in the art in the event any details of such hardware or such software are not expressly described herein.

Embodiments of the present disclosure provide solid state quantum memory devices that can operate at room temperature and are suitable for quantum communication applications. The quantum memory devices of the present disclosure comprise a micro-ring resonator (MRR), a frequency tuner, a quantum memory material portion, and a magnetic field generator. The frequency tuner may comprise doped semiconductor materials or two-dimensional conductive materials, and the magnetic field generator includes a metallic structure configured to pass electrical current therethrough.

To store quantum information, the MRR couples a quantum signal in the form of photons transmitted into a waveguide with a resonant photon state within the MRR, thereby capturing the incoming photons within the MRR. The resonant frequency of the MRR can be tuned by the frequency tuner, which tunes the resonance frequency (and thus, the resonance wavelength) of photons that can be stored in the MRR. The captured photons are then stored in the quantum memory material in the form of quantum excitation at a higher energy state than the ground state. The magnetic field generator is used to increase the coupling between the energy level of the captured photons and the quantum transition from the ground state to the excitation state. The magnetic field may be turned off to decouple the quantum transition and the resonant photon energy state in the MRR.

To retrieve the quantum information, a magnetic field may be applied to the quantum memory material, thereby re-establishing coupling between the quantum transition from the ground state to the excitation state and a resonant photon state within the MRR. Photons are generated in the MRR as the excitation state decays to the ground state in the quantum memory material. The frequency tuner re-establishes coupling between the energy state of photons in the MRR and the energy state of photons in the waveguide, and releases photons from the waveguide.

A two-dimensional quantum memory array is provided. In this embodiment, a one-dimensional array of waveguides can function as bit lines. Word lines can be connected to a respective row of frequency tuners in a two-dimensional array of quantum memory cells. Access lines that are parallel to the word lines can be used to control flow of electrical current through a row of metallic structures that can generate a magnetic field in a row of quantum memory material portions.

According to an aspect of the present disclosure, the two-dimensional quantum memory array may be formed in a first die, which may be a photonic die that does not include semiconductor devices. Generally, the first die can be a photonic integrated die. A second die, which may be a semiconductor die including a control circuit containing field effect transistors, can be bonded to the first die through metal-to-metal bonding, C4 bonding, or C2 bonding. Thus, a bonded assembly can include the two-dimensional quantum memory array on one side, and can include a control circuit on another side. The second die may be any semiconductor die, such as a system-on-integrated-chip (SoIC) die.

FIGS. 1A-1C illustrate a manufacturing process for forming first dies 100 according to an embodiment of the present disclosure.

Referring to FIG. 1A, a two-dimensional array of first dies 100 can be formed on a carrier substrate 9. The carrier substrate 9 may comprise any substrate that can be subsequently removed. For example, the carrier substrate 9 may comprise a semiconductor substrate, an insulating substrate, or a conductive substrate. Each first die 100 may comprise a quantum memory array 101 including a two-dimensional array of quantum memory cells 10. Structure of each quantum memory cell 10 and processes for forming the quantum memory cells 10 are subsequently described in detail with reference to other drawings of this disclosure. For example, first dielectric material layers 130 may be formed over the carrier substrate 9, and the quantum memory arrays 101 can be formed within a subset of the first dielectric material layers 130. First metal interconnect structures 180 may be formed in the first dielectric material layer 130. A first subset of the first metal interconnect structures 180 may be formed as components of the quantum memory arrays 101, and a second subset of the first metal interconnect structures 180 may be used to provide metal wiring for the quantum memory arrays 101. First metallic bonding pads 198 may be formed at the top level of the first dielectric material layers 130. The first metallic bonding pads 198 may be configured for metal-to-metal bonding, controlled collapse chip connection (C4) bonding, or microbump bonding (also referred to as C2 bonding).

Referring to FIG. 1B, the carrier substrate 9 can be removed. For example, the carrier substrate 9 may be removed by cleaving the carrier substrate 9 off the assembly of the first dielectric material layers 130 and structures embedded therein. Alternatively, the carrier substrate 9 may be removed by backside grinding, polishing, an anisotropic etch process, and/or an isotropic etch process.

Referring to FIG. 1C, the two-dimensional array of first dies 100 can be diced along dicing channel to provide multiple first dies 100. Each first die may comprise a respective quantum memory array 101, first metal interconnect structures 180, and first metallic bonding pads 198 that are embedded within first dielectric material layers 130.

Figures 2A, 2B:
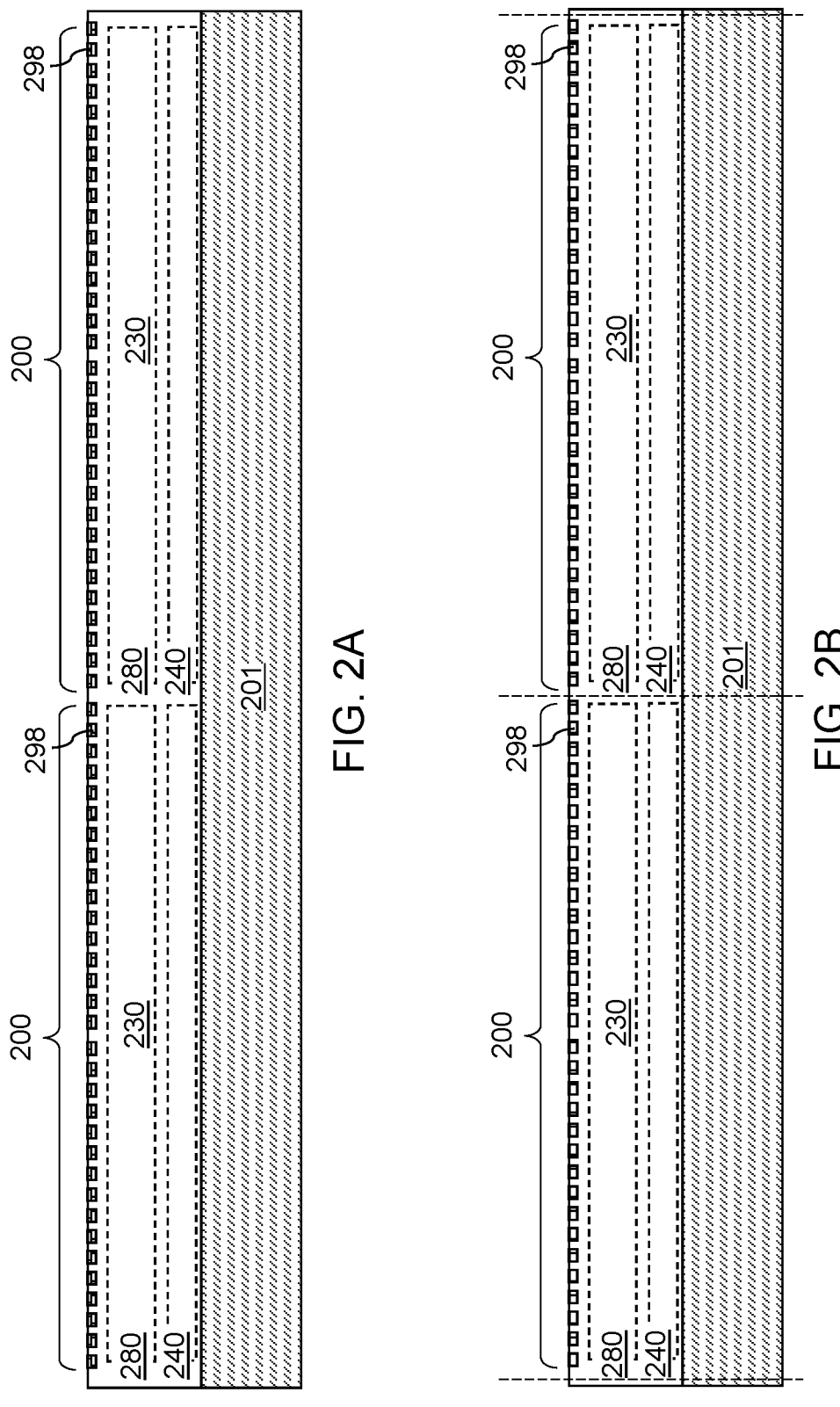
FIGS. 2A and 2B illustrate a manufacturing process for forming second dies according to an embodiment of the present disclosure.

FIGS. 2A and 2B illustrate a manufacturing process for forming second dies 200 according to an embodiment of the present disclosure.

Referring to FIG. 2A, a two-dimensional array of semiconductor dies 200 can be formed on a semiconductor substrate 201. Each semiconductor die 200 comprises a control circuit 240 configured to control operation of a quantum memory array 101 in a first die 100. The control circuit 240 may comprise field effect transistors, such as complementary metal-oxide-semiconductor (CMOS) field effect transistors. Each control circuit 240 may comprise a frequency tuner controller circuit and a current switch circuit, which are described in detail in subsequent sections. Further, each second die 200 may comprise second dielectric material layers 230 embedding second metal interconnect structures 280. A first subset of the second metal interconnect structures 280 may be used to provide electrical interconnection among the field effect transistors of the control circuits 240, and a second subset of the second metal interconnect structures 280 may be used to provide electrical interconnection between the control circuits 240 and a respective set of second metallic bonding pads 298 that are located at the topmost level of the second dielectric material layers 230. A subset of the second metallic bonding pads 298 may have a mirror image pattern of the pattern of first metallic bonding pads 198 in a first die 100. The second metallic bonding pads 298 may be configured for metal-to-metal bonding, controlled collapse chip connection (C4) bonding, or microbump bonding (also referred to as C2 bonding).

Referring to FIG. 2B, the two-dimensional array of second dies 200 can be diced along dicing channel to provide multiple second dies 200. Generally, each second die 200 comprises a control circuit 240, second metal interconnect structures 280, and second metallic bonding pads 298 that are embedded within second dielectric material layers 230. The control circuit 240 comprises semiconductor devices such as field effect transistors, and is configured to provide control signals for the quantum memory array 101 in a first die 100.

Figure 3:
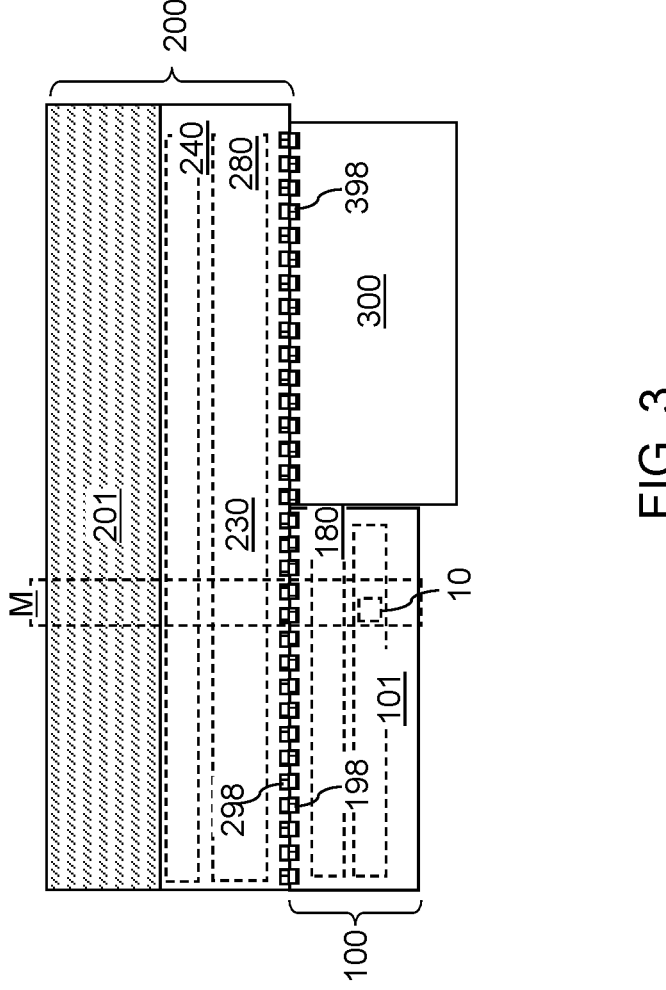
FIG. 3 is a vertical cross-sectional view of a bonded assembly according to an embodiment of the present disclosure.

Referring to FIG. 3, a first die 100 can be bonded to a second die 200. Generally, the first die 100 may be a photonic die comprising waveguides for directing propagation paths of photons. Further, the first die 100 comprises a quantum memory array 101 of the present disclosure. The second die 200 comprises a semiconductor die including semiconductor devices such as field effect transistors. The second die 200 comprises a control circuit for controlling operation of quantum memory cells 10 in the quantum memory array 101. The control signal can be transmitted across the first die 100 and the second die 200 through electrically conductive paths including a respective bonded pair of a first metallic bonding pad 198 and a second metallic bonding pad 298. While the present disclosure is described using an embodiment in which the second metallic bonding pads 298 are bonded to the first metallic bonding pads 198 via metal-to-metal bonding to provide electrically conductive paths extending across the first die 100 and the second die 200, embodiments are expressly contemplated herein in which the electrically conductive paths comprise bonding structures including solder balls. Optionally, an additional die, such as a third die 300, may be attached to the second die 200. The third die 300 may comprise a semiconductor die including at least one field effect transistor therein. The third die 300 may comprise a logic die, a memory die, a passive device die, or any other type of semiconductor die. The third die 300 may comprise third metallic bonding pads 398, which are bonded to a subset of the second metallic bonding pads 298 in the second die.

Figure 4A:
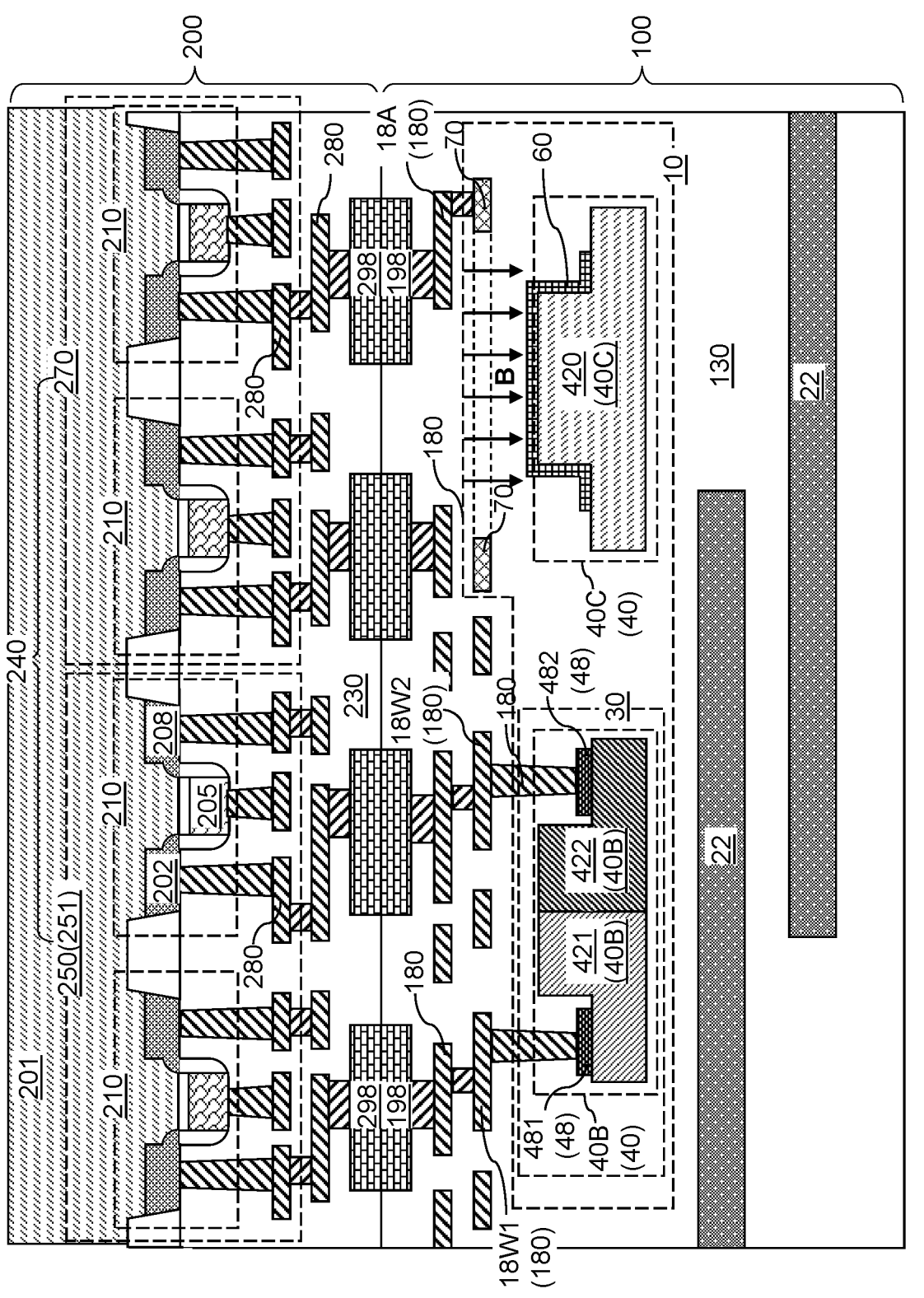
FIG. 4A is a magnified view of region M in FIG. 3 in embodiments in which the first die in the bonded assembly of FIG. 3 is in a first configuration.
Figure 4B:
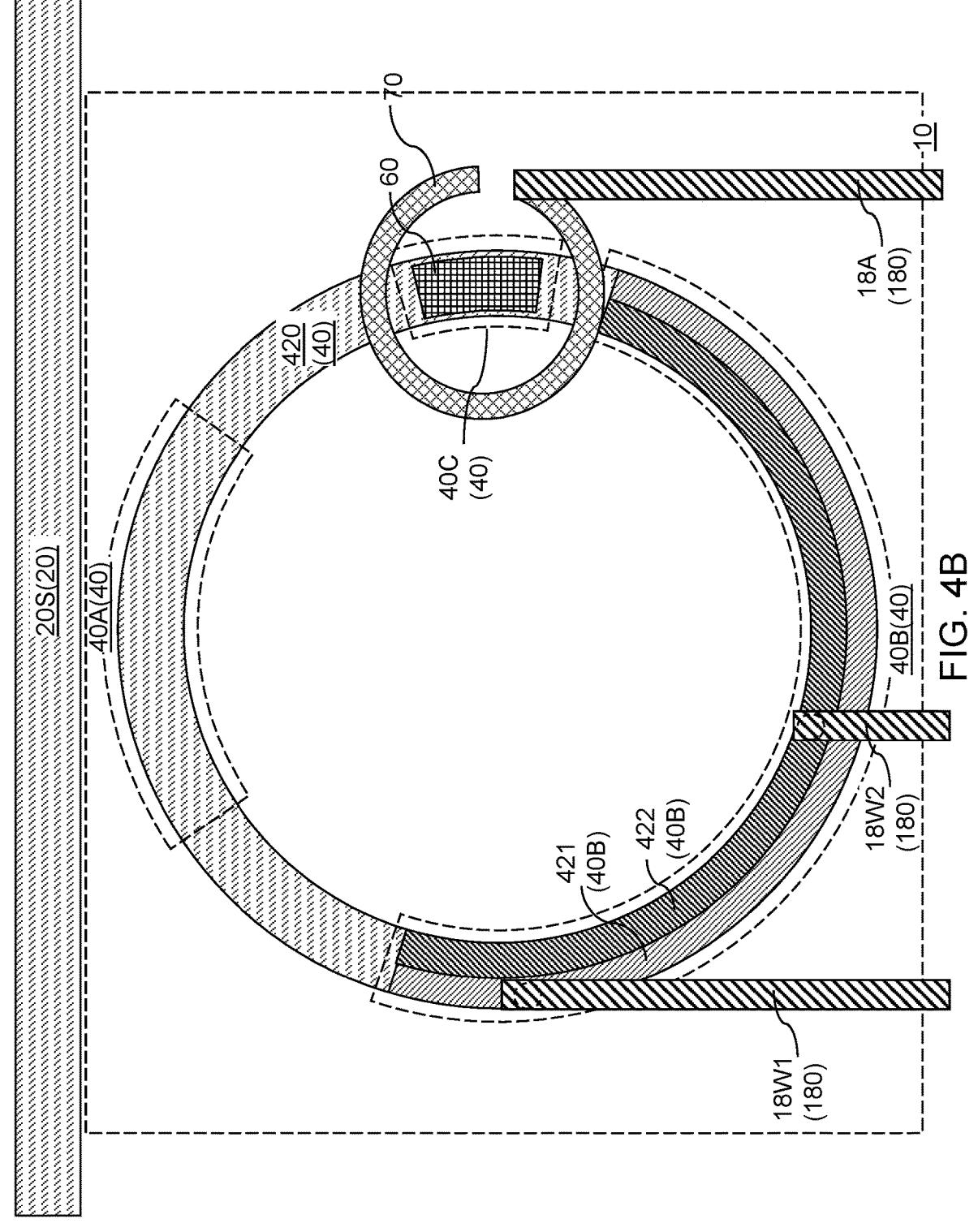
FIG. 4B is a schematic plan view of the first configuration of the first die in FIG. 4A.

Referring to FIGS. 4A and 4B, a first configuration of a region including a quantum memory cell 10 in the first die 100 and a portion of the control circuit 240 in the second die 200 that is electrically connected to the quantum memory cell 10 is illustrated. FIG. 4A is a magnified view of region M in FIG. 3 in embodiments in which the first die 100 in the bonded assembly of FIG. 3 is in a first configuration. FIG. 4B is a schematic plan view of the first configuration of the first die 100 in FIG. 4A in which first metal interconnect structures 180 and peripheral components are omitted for clarity.

Generally, each quantum memory cell 10 comprises a micro-ring resonator (MRR) 40. A micro-ring resonator (MRR) is a waveguide that is topologically homeomorphic to a torus and designed with dimension such that at least one resonance frequency, and correspondingly, at least one resonance wavelength, is provided. Photons having a resonance frequency can be trapped in a closed loop of the MRR. The trapped photons can travel around the circumference of a generally toroidal structure of the MRR, and semi-permanently trapped inside the MRR until the photons interact with energy states in surrounding materials or within the materials of the MRR.

The MRR 40 of the present disclosure comprises a material having a high refractive index. In some embodiments, the MRR 40 may be made of a semiconductor material such as silicon. In some embodiments, the MRR 40 may be made of silicon nitride. The confined photons in the MRR 40 are in a resonance mode, which is characterized by the condition that the wavefunction representing the photons interfere constructively during propagation around the MRR 40. Generally, the resonance condition of the MRR 40 is given by: $nC = m\lambda$, in which n is the refractive index of the MRR 40, C is the effective average circumference of the MRR 40, $\lambda$ is a resonance wavelength, and m is a non-negative integer. For the fundamental resonance mode, m is equal to 1.

Given the above equation and the wavelength $\lambda$ (as measured in vacuum) of photons used in the operation of the quantum memory cell 10, the effective average circumference of the MRR 40 can be determined. The wavelength $\lambda$ may be 1,550 nm (generated using a semiconductor material such as indium phosphide (InP) or gallium arsenide (GaAs)), 1,330 nm (generated using a semiconductor material such as indium gallium arsenide phosphide (InGaAsP)), 852 nm (the cesium D2 line), 795 nm (the rubidium D1 line), 780 nm (the rubidium D2 line), etc.

In embodiments in which the wavelength A is 1,330 nm and the MRR 40 comprises silicon (having a refractive index of 3.5) and if the fundamental node is used to store photons (i.e., m=1), the average circumference of the MRR 40 may be about 380 nm. In embodiments in which the MRR 40 has a circular toroidal shape in a top-down view, the effective radius of the MRR may be about 60.4 nm. In embodiments in which the wavelength A is 1,330 nm and the MRR 40 comprises silicon nittride (having a refractive index of 2.0) and if the fundamental node is used to store photons (i.e., m=1), the average circumference of the MRR 40 may be about 6650 nm. In embodiments in which the MRR 40 has a circular toroidal shape in a top-down view, the effective radius of the MRR may be about 106 nm.

A waveguide 20 is provided for each MRR. The waveguide 20 is configured to spatially confine paths of photons therein. The width and the height of the waveguide 20 can be selected to confine photons of the wavelength $\lambda$ (i.e., the resonance wavelength of the MRR 40) within the waveguide 20 as the photons propagate along the lengthwise direction of the waveguide 20. Typically, the width and the height of the waveguide 20 may be in a range from 300 nm to 600 nm, such as from 400 nm to 500 nm, in embodiments in which the waveguide comprises silicon nitride, and may be in a range from 200 nm to 500 nm, such as from 300 nm to 400 nm, in embodiments in which the waveguide 20 comprises silicon. In one embodiment, the waveguide 20 may comprise the same material as the MRR 40. In one embodiment, the waveguide 20 consists of a semiconductor material such as silicon. In this embodiment, the waveguide 20 may be a semiconductor waveguide 20S.

The MRR 40 comprises a first segment 40A that is curved, and is generally parallel to, a segment of the waveguide 20 so that optical coupling is provided between the waveguide 20 and the MRR. The average gap between the first segment 40A and the waveguide 20 may be in a range from about 50 nm to 100 nm in embodiments in which of a waveguide 20 made of silicon nitride, and may be in a range from about 100 nm to 200 nm in embodiments in which of a waveguide 20 made of silicon.

Each quantum memory cell 10 comprises a frequency tuner 30 that is formed on the MRR 40. Generally, the frequency tuner 30 is configured to modulate a photon resonance frequency (also referred to as a resonance frequency) in the MRR 40 by modifying an effective refractive index within, or around, a second segment 40B of the MRR 40. The frequency tuner 30 can modulate the effective refractive index within, or in the vicinity of, the second segment 40B of the MRR 40 by altering charge distribution within, or around, the second segment 40B of the MRR. The frequency tuner 30 may be formed as a component of the MRR 40, or may be formed as an additional component that appertains to the MRR 40.

In the first configuration illustrated in FIGS. 4A and 4B, the frequency tuner 30 may be formed by: forming a first doped semiconductor portion 421 in a first portion of the second segment 40B of the MRR 40, and forming a second doped semiconductor portion 422 in a second portion of the second segment 40B of the MRR 40. The first doped semiconductor portion 421 has a doping of a first conductivity type, the second doped semiconductor portion 422 has a doping of a second conductivity type that is an opposite of the first conductivity type. In one embodiment, the first doped semiconductor portion 421 and the second doped semiconductor portion 422 are in direct contact with each other. In one embodiment, a vertically-extending p-n junction is formed between the first doped semiconductor portion 421 and the second doped semiconductor portion 422.

The first doped semiconductor portion 421 and the second doped semiconductor portion 422 can be formed by providing an MRR 40 including an intrinsic or lightly-doped semiconductor material, and by performing two masked ion implantation processes that implant p-type dopants and n-type dopants, respectively. The first doped semiconductor portion 421 may include dopants of the first conductivity type at a first atomic concentration in a range from $5.0 \times 10^{19}/cm^3$ to $2.0 \times 10^{21}/cm^3$, and the second doped semiconductor portion 422 may include dopants of the second conductivity type at a second atomic concentration in a range from $5.0 \times 10^{19}/cm^3$ to $2.0 \times 10^{21}/cm^3$. Higher or lower atomic concentrations of dopants may also be used for the first doped semiconductor portion 421 and/or the second doped semiconductor material portion 422. Portions of the MRR 40 except the second segment 40B may comprise an intrinsic or lightly-doped semiconductor material portion 420, which may be intrinsic, or may include electrical dopants at an atomic concentration less than $1.0 \times 10^{18}/cm^3$, and/or less than less than $1.0 \times 10^{17}/cm^3$, and/or less than $1.0 \times 10^{16}/cm^3$.

In one embodiment, an electrical bias voltage can be applied across the first doped semiconductor portion 421 and the second doped semiconductor material portion 422 (i.e., across the p-n junction), and the effective refractive index within the second segment 40B of the MRR 40 can be modulated by altering a charge carrier distribution within the second segment 40B of the MRR 40 (which is induced by the applied electrical bias voltage). In one embodiment, the frequency tuner 30 comprises a p-n junction between the first doped semiconductor portion 421 and the second doped semiconductor portion 422, and the electrical bias voltage modulates a width of a depletion zone across the p-n junction. Generally, the percentage shift in the resonance frequency due to modulation of the effective refractive index in the second segment 40B of the MRR may be in a range from 0.5% to 5%, such as from 1% to 3%, although lesser and greater percentages may also be used.

While the present disclosure described using an embodiment in which the p-n junction between the first doped semiconductor portion 421 and the second doped semiconductor portion 422 is formed midway between the inner most periphery of the MRR 40 and the outermost periphery of the MRR 40 along a vertical direction, embodiments are expressly contemplated herein in which the p-n junction is formed in different geometries. Further, while the present disclosure is described using an embodiment in which the MRR 40 has a stepped vertical cross-sectional profile, embodiments are expressly contemplated in which the MRR 40 is formed with different vertical cross-sectional profiles.

Each quantum memory cell 10 comprises a quantum memory material portion 60 including a quantum memory material. The quantum memory material has a ground state and an excitation state that stores photons therein. Generally speaking, the quantum memory material portion 60 can be formed within, or on, a third segment 40C of the MRR 40. The first segment 40A, the second segment 40B, and the third segment 40C can be azimuthally spaced apart among one another.

As used herein, a "quantum memory material" refers to that can store and retain quantum information for a period of time by maintaining a quantum excitation state having a higher energy level than the energy level of a ground state. Quantum memory materials are also known as quantum state capture material, quantum state retention material, photon-capture materials, photonic memory materials, etc. Exemplary quantum memory materials include materials rare-earth-ion-doped crystals, semiconductor quantum dots, hexagonal boron nitride (hBN), etc. In one embodiment, the quantum memory material comprises, and/or consists essentially of, hexagonal boron nitride including nitrogen vacancy. In one embodiment, the quantum memory material comprises, and/or consists essentially of, $MoSe_2$, $WSe_2$, or AlN.

In one embodiment, the quantum memory material may be a two-dimensional material providing a higher in-plane electrical conductivity than out-of-plane electrical conductivity. In one embodiment, the ratio of the in-plane electrical conductivity to the out-of-plane electrical conductivity may be greater than 3, and/or 10, and/or 30. The thickness of the quantum memory material portion 60 may be in a range from 0.3 nm to 2 nm, such as from 0.6 nm to 1.5 nm, although lesser and greater thicknesses may also be used. In one embodiment, the quantum memory material portion 60 comprises a film of the quantum memory material having a thickness that is less than 20%, and/or less than 10%, and/or less than 5%, and/or less than 2%, of a maximum lateral dimension of the film.

Each quantum memory cell 10 comprises a metallic structure 70 that is configured to generate a magnetic filed in the third segment 40C of the MRR 40 and in the quantum memory material portion 60 upon flowing of electrical current therethrough. The metallic structure 70 is formed over, adjacent to, the third segment 40C of the waveguide 20. Generally, the metallic structure 70 comprises one of a coil structure, an antenna structure, and a transmission line structure. In the illustrated example in FIGS. 4A and 4B, the metallic structure 70 comprises a coil structure.

Figure 4C:
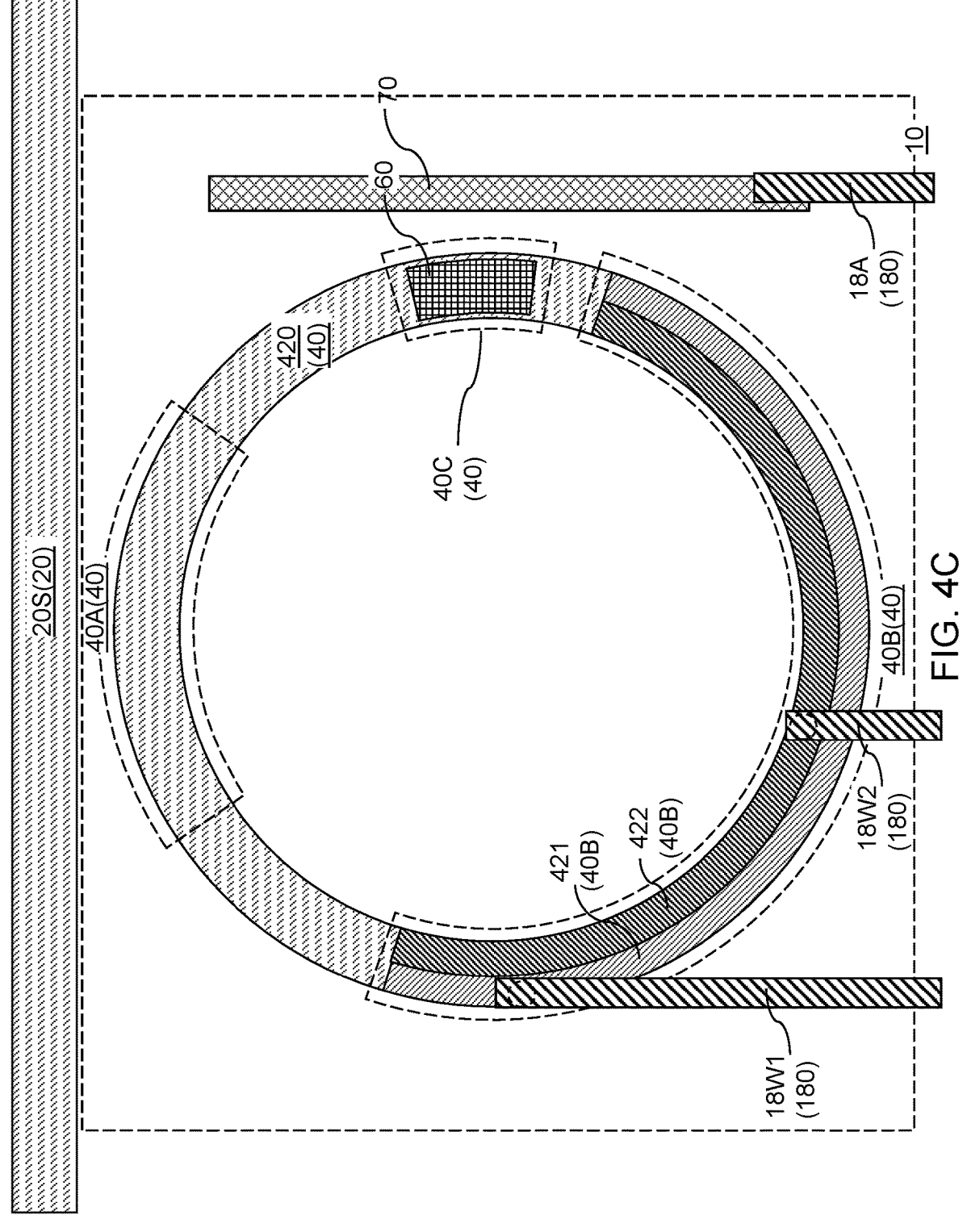
FIG. 4C is a schematic plan view of a first alternative embodiment of the first configuration of the first die in FIG. 4A.

Referring to FIG. 4C, a first alternative embodiment of the first configuration is illustrated, in which the metallic structure 70 comprises a transmission line.

Figure 4D:
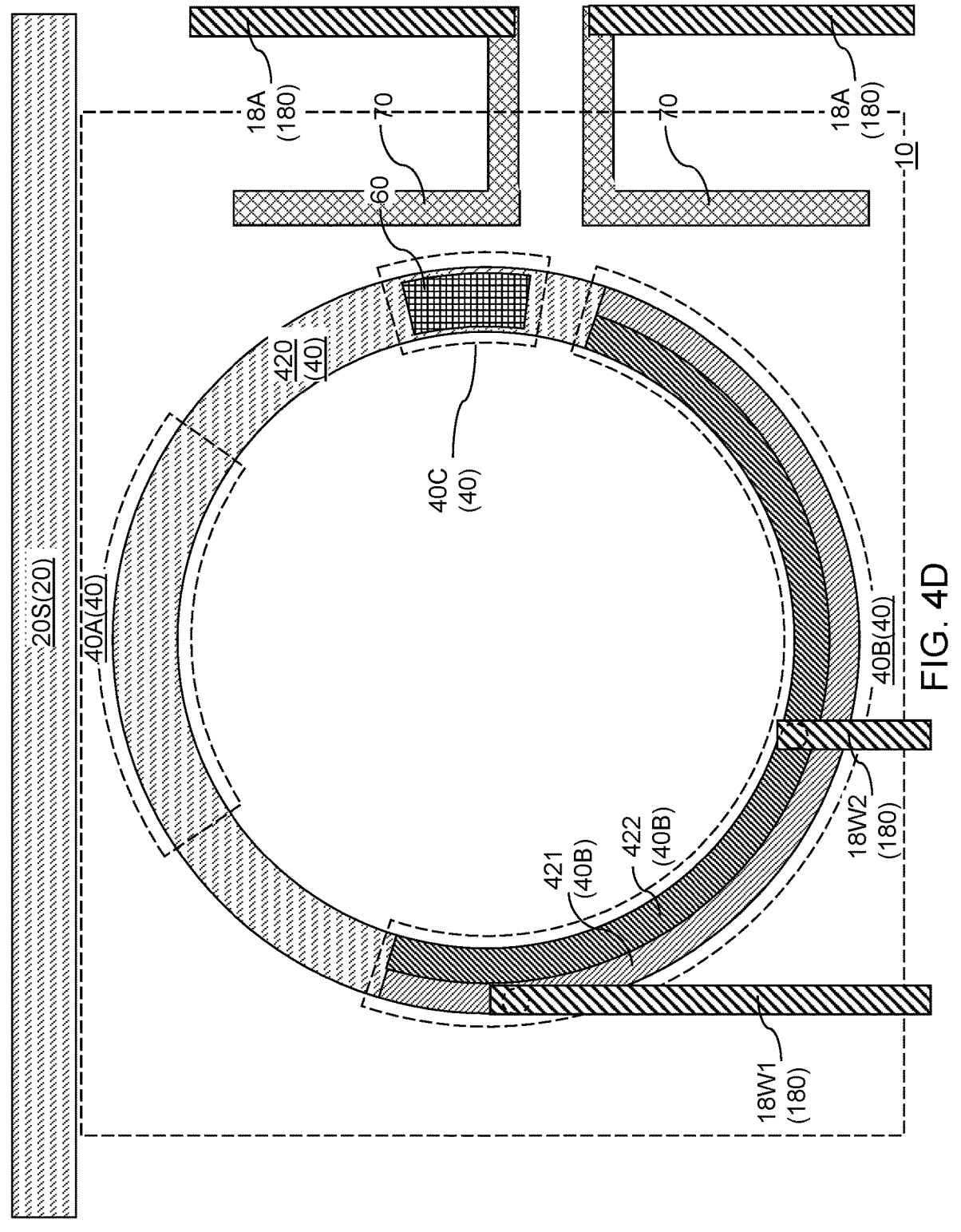
FIG. 4D is a schematic plan view of a second alternative embodiment of the first configuration of the first die in FIG. 4A.

Referring to FIG. 4D, a second alternative embodiment of the first configuration is illustrated, in which the metallic structure 70 comprises an antenna structure.

Referring collectively to FIGS. 4A-4D, each quantum memory cell 10 comprises an MRR 40, a frequency tuner 30, a quantum memory material portion 60, and a metallic structure 70. Each quantum memory cell 10 is formed within first dielectric material layer 130, and as such, is embedded within the first dielectric material layer 130. Various metal interconnect structures 180 are formed in the first dielectric material layers 130. Further, first metallic bonding pads 198 can be formed in the topmost level of the first dielectric material layers 130. Additional waveguides 22 may be formed underneath the quantum memory cells 10.

Control signals for the frequency tuner 30 can be provided through word lines (18W1, 18W2), which are a subset of the first metal interconnect structures 180. In one embodiment, the word lines (18W1, 18W2) may comprise a first word line 18W1 that is connected to the first doped semiconductor portion 421, for example, through a first contact structure 481 such as a first metal-semiconductor alloy portion (e.g., a metal silicide portion); and a second word line 18W2 that is connected to the second doped semiconductor portion 422, for example, through a second contact structure 482 such as a second metal-semiconductor alloy portion. The first contact structure 481 and the second contact structure 482 are collectively referred to as contact structures 48. Each of the word lines (18W1, 18W2) can be electrically connected to a respective one of the first metallic bonding structures 198 through a respective subset of the first metal interconnect structures 180.

Electrical current through the metallic structure 70 for generating the magnetic field B in the third segment 40C of the MRR 40 and in the quantum memory material portion 60 can be transmitted through an access line 18A, which is a subset of the first metal interconnect structure 180. Two ends of the access line 18A can be electrically connected to a pair of first metallic bonding structures 198 through a respective subset of the first metal interconnect structures 180.

According to an aspect of the present disclosure, control signals for controlling operation of the quantum memory cell 10 can be provided by a control circuit 240 in the second die 200. In other words, the control circuit 240 is formed in a second die 200, which is bonded to the first die 100. The control circuit 240 comprises semiconductor devices, and is configured to generate captured photons in the MRR 40 from incident photons in the waveguide 20. Specifically, the control circuit 240 is configured to modulate the photon resonance wavelength (i.e., to modulate the resonance frequency) in the MRR 40 during a first step of a photon capture operation to match a predefined wavelength (which is a photon wavelength of photons in the waveguide 20) and to generate captured photons in the MRR 40.

In one embodiment, the control circuit 240 comprises a frequency tuner control circuit 250 that controls the photon resonance wavelength (and thus, the resonance frequency) of the frequency tuner 30. In embodiments in which the modulation of the effective refractive index of the second segment 40B or a cladding material around the second segment 40B is effected by application of an electrical bias voltage, the frequency tuner control circuit 250 may comprise an electrical bias circuit 251 configured to apply an electrical bias voltage to the frequency tuner 30. In embodiments in which the frequency tuner 30 comprises a first doped semiconductor portion 421 and a second doped semiconductor portion 422, the frequency tuner control circuit 250 may comprise an electrical bias circuit 251 configured to apply an electrical bias voltage across the first doped semiconductor portion 421 and the second doped semiconductor portion 422.

According to an aspect of the present disclosure, the control circuit 240 is configured to transfer the energy in the captured photons in the MRR 40 into the quantum memory material portion 60 by inducing transition (i.e., state transition) of at least one electronic state within the quantum memory material portion 60 to a respective high energy state that differs from the respective electronic state by the energy E of a captured photon. The energy E of the captured photon is given by hv, in which h is Plank's constant and v is the frequency of the photon. The energy E of the captured photon is also given by $E=hc/\lambda$, in which c is the speed of light in vacuum and $\lambda$ is the wavelength of the light in vacuum. Generally, the control circuit 240 induces quantum coupling between the captured photons and the state transition by applying a magnetic field to the third segment 40C of the MRR 40 and in the quantum memory material portion 60. In one embodiment, the control circuit 240 is configured to induce a state transition, i.e., a quantum transition, from the ground state to the excitation state within the quantum memory material.

In one embodiment, the component of the control circuit 240 configured to induce a state transition in the quantum memory material may comprise a current switch circuit 270. The current switch circuit 270 may comprise at least one field effect transistor 210 that is configured to switch electrical current that flows through the metallic structure 70. The current switch circuit 270 can be electrically connected to the metallic structure 70 by bonding the second die 200 to the first die 100. The electrically conductive paths between the current switch circuit 270 and the metallic structure 70 may comprise a subset of the first metal interconnect structures 180 that includes an access line 18A, a subset of the first metallic bonding pads 198, a subset of the second metallic bonding pads 298, and a subset of the second metal interconnect structures 280. Generally, the quantum memory cell 10 including an MRR 40 is formed within first dielectric material layers 130 in a first die 100, the current switch circuit 270 is formed in a second die 200 that is different from the first die 100, and the method comprises bonding the second die 200 to the first die 100.

The second die 200 may be any type of semiconductor die, such as a system-on-integrated-chip (SoIC) die, a central processor unit, a graphic processor unit, a memory die, etc. Each of the frequency tuner control circuit 250 and the current switch circuit 270 may comprise a respective set of field effect transistors 210. Each field effect transistor 210 may comprise a respective gate electrode 205, a respective gate dielectric, a respective source region 202, and a respective drain region 208. Generally, each second die 200 comprises a control circuit 240, second metal interconnect structures 280, and second metallic bonding pads 298 that are embedded within second dielectric material layers 230.

According to an aspect of the present disclosure, a quantum memory device comprises: a waveguide 20 configured to spatially confine paths of photons therein; a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40. In one embodiment, the MRR 40 is embedded within first dielectric material layers 130 in a first die 100.

In one embodiment, a control circuit 240 including a frequency tuner control circuit 250 can be provided. The control circuit 240 can be configured to generate captured photons in the MRR 40 from incident photons in the waveguide 20 and to induce a state transition from the ground state to the excitation state within the quantum memory material. The control circuit 240, and specifically, the frequency tuner control circuit 250, can be configured to modulate the photon resonance wavelength in the MRR 40 during a first step of a photon capture operation to match a predefined wavelength (which is a photon wavelength of photons in the waveguide 20) and to generate captured photons in the MRR 40.

In one embodiment, the control circuit 240 can be configured to induce quantum coupling between the captured photons and the state transition by applying a magnetic field to the third segment 40C of the MRR 40 and in the quantum memory material portion 60 during a second step of the photon capture operation. In one embodiment, a magnetic field generator (70, 270) can be provided, which is configured to generate a magnetic field in the third segment 40C of the MRR 40 and in the quantum memory material portion 60. The magnetic field generator (70, 270) can be used to increase quantum absorption of the captured photons by the quantum memory material.

In one embodiment, the magnetic field generator (70, 270) comprises a metallic structure 70 disposed over, or adjacent to, the third segment 40C of the waveguide 20, and a current switch circuit 270 comprising at least one field effect transistor 210 that is configured to switch electrical current that flows through the metallic structure 70. The current switch circuit 270 can be component of the control circuit 240. In one embodiment, the control circuit 240, and specifically, the current control circuit 270, can be configured to generate the magnetic field during a second step of the photon capture operation using the magnetic field generator (70, 270) to increase quantum absorption of the captured photons by the quantum memory material. Thus, the energy of the incident photons that propagate through the waveguide 20 can be captured as excitation energy in excitation states in the quantum memory material portion 60.

Generally, the quantum memory material portion 60 can hold the excitation states for at least 1 microsecond, and typically for several microseconds or for over 10 microseconds without significant decay in the excitation states. During a photon release operation in which the energy stored in the quantum memory material portion 60 is released as photons generated in the waveguide 20, the processing steps used to capture photons in the waveguide 20 are performed in a reverse order.

In one embodiment, the control circuit 240 is configured to generate the magnetic field during a first step of a photon release operation using the magnetic field generator (70, 270) to increases quantum coupling between energy stored in the quantum memory material and a resonant photon state within the MRR 40. The magnetic field enhances coupling between the state transition from the excitation states to the ground states in the quantum memory material portion 60 and photon generation in the MRR 40. Photons are generated in the MRR as the excitation states transition to the ground states in the quantum memory material portion 60.

Further, the control circuit 240, and specifically, the frequency tuner control circuit 250, can be configured to modulate the photon resonance wavelength in the MRR 40 during a second step of a photon release operation to match the predefined wavelength (which is the photon wavelength of photons in the waveguide 20) and to generate photons in the waveguide 20.

The magnetic field generator (70, 270) comprises a metallic structure 70 disposed over, or adjacent to, the third segment 40C of the waveguide 20 and configured to generate a magnetic field in the third segment 40C of the MRR 40 and in the quantum memory material portion 60 upon flowing of electrical current therethrough. The metallic structure 70 comprises one of a coil structure, an antenna structure, and a transmission line structure. The MRR 40 is embedded within the first dielectric material layers 130 in the first die 100, and the current switch circuit 270 is located in a second die 200 that is bonded to the first die 100.

The frequency of the magnetic field applied to the third segment 40C of the MRR 40 and to the quantum memory material portion 60 may be in a range from 1 GHZ to 60 GHz, such as from 3 GHz to 30 GHz, although higher frequencies may also be used. In one embodiment, the current switch circuit 270 and the metallic structure 70 can be configured such that the magnetic field has a time-and-space averaged magnitude within a volume of the third segment 40C of the waveguide 20 in a range from 0.1 T to 5.0 T. As used herein, a time-and-space averaged magnitude refers to the average magnitude of the magnetic field that is forming by generating a space average of the magnitude of the magnetic field that is calculated over the entire volume of the quantum memory material portion 60 for each time point while the magnetic field is turned on, and then averaging the space average of the magnitude of the magnetic field (as generated as a function of time) over the time interval during which the magnetic field is turned on. Generally, the magnetic field can be substantially perpendicular to the direction of high electrical conductivity within the quantum memory material. In one embodiment, the magnetic field generator (70, 270) is configured to generate the magnetic field such that an average of a vertical component of the magnetic field within a volume of the film has a magnitude that is at least 90% of a magnitude of an average of the magnetic field within the volume of the film.

In one embodiment, the frequency tuner 30 comprises a first doped semiconductor portion 421 embodied as a first portion of the second segment 40B of the MRR 40 and having a doping a first conductivity type, and a second doped semiconductor portion 422 embodied as a second portion of the second segment 40B of the MRR 40 and having a doping of a second conductivity type that is an opposite of the first conductivity type. An electrical bias circuit 251 can be formed, for example, in the second die 200. The electrical bias circuit 251 is configured to apply an electrical bias voltage across the first doped semiconductor portion 421 and the second doped semiconductor portion 422.

In one embodiment, the first doped semiconductor portion 421 and the second doped semiconductor portion 422 are in direct contact with each other. In one embodiment, a vertically-extending p-n junction is present between the first doped semiconductor portion 421 and the second doped semiconductor portion 422. In this embodiment, the photon resonance frequency is modulated by applying an electrical bias voltage across the first doped semiconductor portion 421 and the second doped semiconductor portion 422.

Generally speaking, the quantum memory device illustrated in FIGS. 4A-4D can be operated by: transmitting photons having a photon wavelength through the waveguide 20; modulating a photon resonance wavelength in the MRR 40 to optically couple the MRR 40 to the photons in the waveguide 20 and to generate captured photons in the MRR 40; and generating captured photons in the MRR 40 by modulating a photon resonance wavelength in the MRR 40 to match the photon wavelength; and transferring energy in the captured photons into the quantum memory material portion 60 in a form of quantum excitation from the ground state to the excitation state. In one embodiment, energy in the captured photons can be transferred into the quantum memory material portion 60 in a form of quantum excitation from the ground state to the excitation state.

According to an aspect of the present disclosure, the energy of the captured photons in the MRR can be transferred into the quantum memory material portion 60 through quantum coupling between the captured photons and the quantum excitation by applying a magnetic field to the third segment 40C of the MRR 40 and the quantum memory material portion 60. Specifically, absorption of the captured photons by the quantum memory material through transition from the ground state to the excited state in the quantum memory material can be induced, whereby a data bit is stored in the quantum memory material portion 60. In one embodiment, the memory cell 10 comprises a magnetic field generator (70, 270) configured to generate a magnetic filed in the third segment 40C of the MRR 40 and in the quantum memory material portion 60. In this embodiment, transition from the ground state to the excited state in the quantum memory material is induced by generating a magnetic field in the quantum memory material portion 60 and the third segment 40C of the MRR 40.

In one embodiment, the quantum memory device comprises a metallic structure 70 disposed over, or adjacent to, the third segment 40C of the waveguide 20. The magnetic filed can be generated in the third segment 40C of the MRR 40 and in the quantum memory material portion 60 by flowing electrical current through the metallic structure 70. The quantum memory device may comprise a current switch circuit 270 including at least one field effect transistor 210. Electrical current that flows through the metallic structure 70 can be switched using the current switch circuit 270 such that the magnetic field is turned on while the electrical current flows through the metallic structure 70, and the magnetic field is turned off while the electrical current does not flow through the metallic structure 70.

During a photon release operation, confined photons can be generated in the MRR 40 by inducing transition from the excited state to the ground state in the quantum memory material. Generation of a photon beam in the waveguide 20 can be induced by inducing optical coupling between the confined photons and the waveguide 20.

Figure 5:
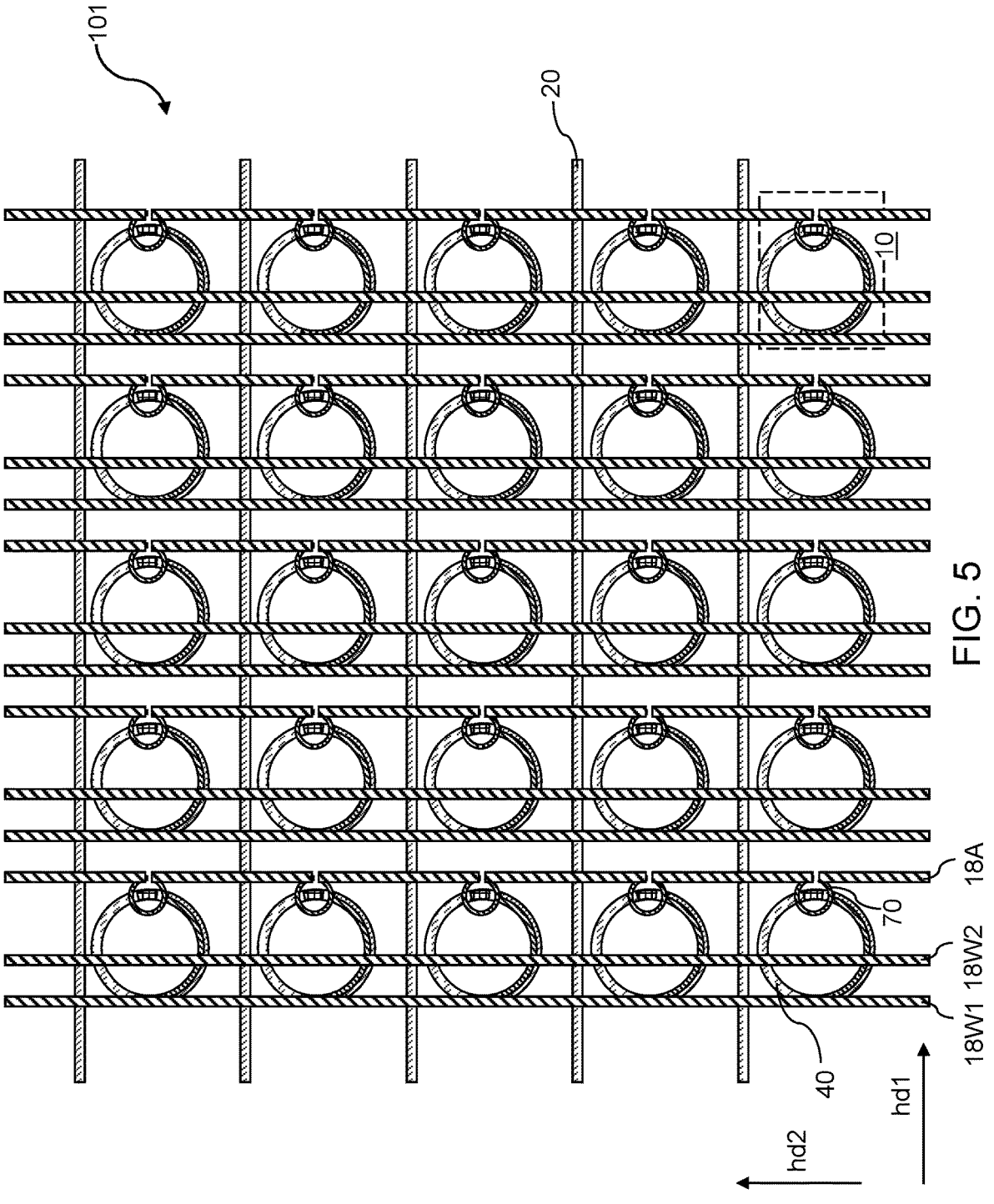
FIG. 5 is a plan view of a quantum memory array within the first die illustrated in FIG. 3.

FIG. 5 is a plan view of a quantum memory array 101 within the first die 100 illustrated in FIG. 3. FIG. 5 corresponds to a zoom-out view of FIG. 4B, and illustrates interconnections between various parts of word lines (18W1, 18W2) and access lines 18A.

Generally, the quantum memory device illustrated collectively in FIGS. 3, 4A-4D, and 5 can be provided by: forming a one-dimensional array of waveguides 20 laterally extending along a first horizontal direction hd1; forming a two-dimensional array of quantum memory cells 10, wherein each of the quantum memory cells 10 comprises a micro-ring resonator (MRR) 40, a frequency tuner 30, and a quantum memory material portion 60; and forming word lines (18W1, 18W2) that are electrically connected to a respective row of frequency tuners 30. The MRR 40 within each quantum memory cell 10 comprises a first segment 40A that is parallel to, and is optically coupled to, a respective waveguide 20 within the one-dimensional array of waveguides 20. The frequency tuner 30 within each quantum memory cell 10 is configured to modulate a photon resonance frequency in the MRR 40 by modifying an effective refractive index within, or around, a second segment 40B of the MRR 40. The quantum memory material portion 60 includes a quantum memory material having a ground state and an excitation state that stores photons therein and formed within or on a third segment 40C of the MRR 40. The word lines (18W1, 18W2) are configured to apply an electrical signal to modify photon resonance frequencies within a respective row of micro-ring resonators 40.

In one embodiment, each of the quantum memory cells 10 comprises a metallic structure 70 that is configured to generate a magnetic filed in the third segment 40C of the MRR 40 and in the quantum memory material portion 60 within a respective quantum memory cell 10 upon flowing of an electrical current therethrough. In one embodiment, access lines 18A can be formed such that the access lines 18A are electrically connected to a respective row of metallic structures 70. As discussed above, each of the metallic structures 70 comprises one of a coil structure, an antenna structure, and a transmission line structure. Current switch circuits 270 can be formed, for example, in the second die 200. Each of the current switching circuits 270 comprises at least one field effect transistor 210 that is configured to switch electrical current. Each of the access lines 18A can be electrically connected to a respective one of the current switch circuits 270, for example, by bonding the second die 200 to the first die 100. Likewise, each of the word lines (18W1, 18W2) can be connected to a respective frequency tuner control circuit 250 by bonding the second die 200 to the first die 100. The word lines (18W1, 18W2) and the access lines 18A can laterally extend along a second horizontal direction hd2, which may, or may not, be perpendicular to the first horizontal direction hd1.

In one embodiment, the access lines 18A can be electrically connected to a respective row of metallic structures 70. Each of the metallic structures 70 is configured to generate a magnetic field in the quantum memory material portion 60 of a respective one of the quantum memory cells 10. The access lines 18A are electrically connected to a respective current switch circuit 270 comprising at least one field effect transistor 210 that is configured to switch electrical current that flows through the respective row of metallic structures 70. Thus, upon activation of a selected active line 18A, a magnetic field is generated in a selected row of quantum memory material portions 60.

Generally, the one-dimensional array of waveguides 20, the two-dimensional array of quantum memory cells 10, and the word lines (18W1, 18W2) are formed in a first die 100. A control circuit 240 configured to control operation of the word lines (18W1, 18W2) can be formed in a second die 200. The control circuit 240 comprises field effect transistors 210. Electrical connection between the control circuit 240 and the word lines (18W1, 18W2) can be provided by bonding the second die 200 to the first die 100.

In one embodiment, the quantum memory device illustrated in FIGS. 3, 4A-4D, and 5 can be manufactured by: forming a first die 100, wherein the first die 100 comprises a one-dimensional array of waveguides 20 laterally extending along a first horizontal direction hd1, a two-dimensional array of quantum memory cells 10, and word lines (18W1, 18W2), wherein each of the quantum memory cells 10 comprises a micro-ring resonator (MRR) 40, a frequency tuner 30, and a quantum memory material portion 60, wherein the MRR 40 comprises a first segment 40A that is parallel to, and is optically coupled to, a respective waveguide 20 within the one-dimensional array of waveguides 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and formed within or on a third segment 40C of the MRR 40 by introducing at least one material for forming the quantum memory material portion 60 within, or on, a third segment 40C of the MRR 40, and wherein the word lines (18W1, 18W2) are electrically connected to a respective row of frequency tuners 30, wherein the word lines (18W1, 18W2) are configured to apply an electrical signal to modify photon resonance frequencies within a respective row of micro-ring resonators 40; forming a second die 200 comprising a control circuit 240 configured to control operation of the word lines (18W1, 18W2), the control circuit 240 comprising field effect transistors 210; and providing electrical connection between the control circuit 240 and the word lines (18W1, 18W2) by bonding the second die 200 to the first die 100.

Generally, the quantum memory device illustrated collectively in FIGS. 3, 4A-4D, and 5 can be operated by: transmitting photons having a photon wavelength through a waveguide 20 that is optically coupled to a selected quantum memory cell 10 within the two-dimensional array of quantum memory cells 10; generating captured photons in the MRR 40 of the selected quantum memory cell 10 by modulating a photon resonance wavelength in the MRR 40 of the selected quantum memory cell 10 to match the photon wavelength; and transferring energy in the captured photons into the quantum memory material portion 60 of the selected quantum memory cell 10 in a form of quantum excitation.

In one embodiment, each of the quantum memory cells 10 comprises a metallic structure 70 configured to generate a magnetic filed in the third segment 40C of the MRR 40 and in the quantum memory material portion 60 within a respective quantum memory cell 10 upon flowing of an electrical current therethrough. In this embodiment, quantum coupling can be induced between the captured photons and the quantum excitation in the quantum memory material portion 60 of the selected quantum memory cell 10 by applying a magnetic field to the third segment 40C of the MRR 40 and the quantum memory material portion 60 of the selected quantum memory cell 10.

In one embodiment, the three-dimensional quantum memory device comprises access lines 18A that are electrically connected to a respective row of metallic structures 70 and electrically connected to a respective current switch circuit 270 comprising at least one field effect transistor 210. In this embodiment, the magnetic field can be generated by turning on a current switch circuit 270 that is connected to the access line that is connected to the metallic structure 70 in the selected quantum memory cell 10.

Figure 6A:
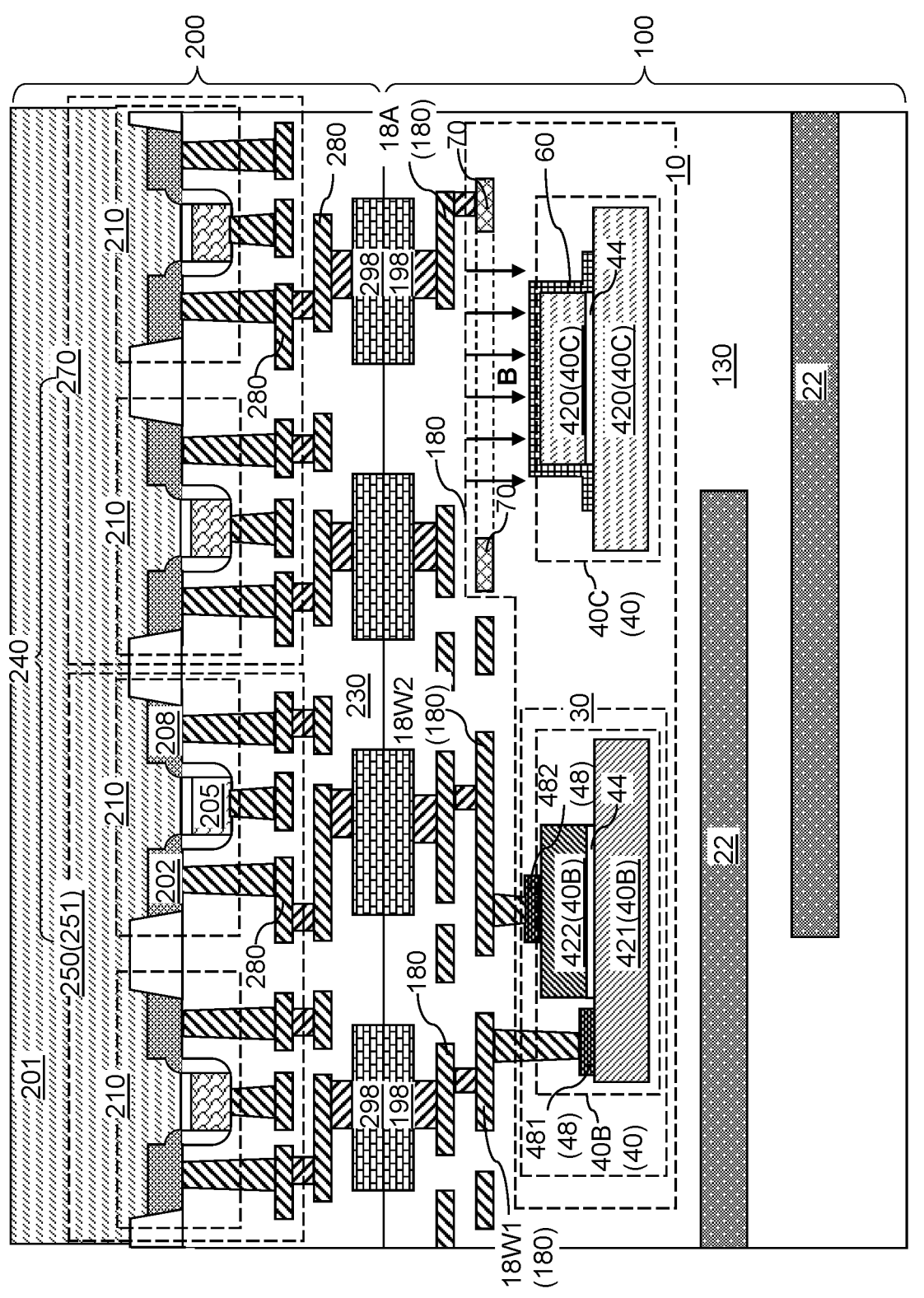
FIG. 6A is a magnified view of region M in FIG. 3 in embodiments in which the first die in the bonded assembly of FIG. 3 is in a second configuration.
Figure 6B:
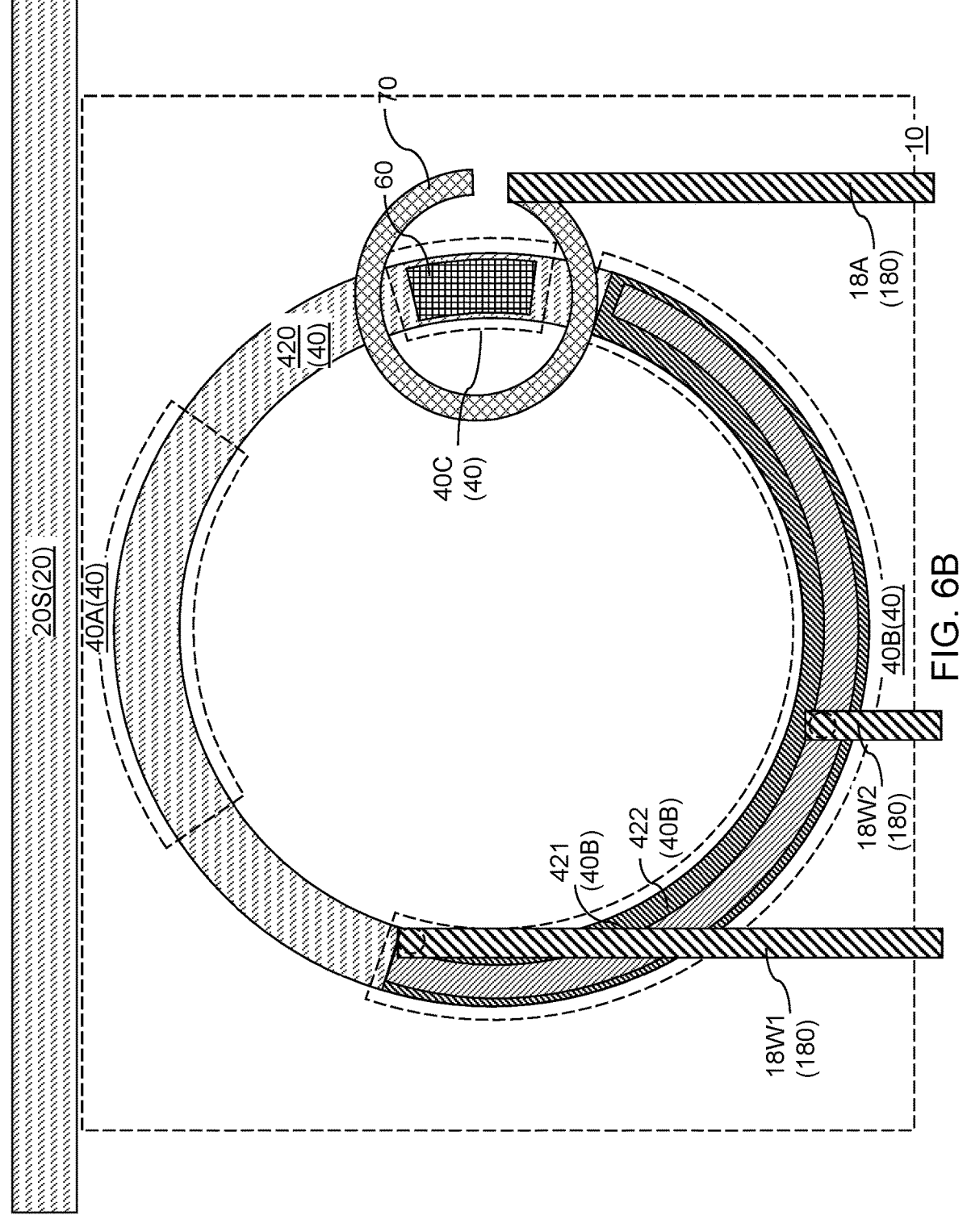
FIG. 6B is a schematic plan view of the first configuration of the first die in FIG. 6A.

FIGS. 6A and 6B illustrates a second configuration of the quantum memory device, which can be derived from the first configuration of the quantum memory device illustrated in FIGS. 3, 4A-4D, and 5 by modifying the frequency tuner 30 within each quantum memory cell 10. FIG. 6A is a magnified view of region M in FIG. 3 in embodiments in which the first die 100 in the bonded assembly of FIG. 3 is in a second configuration. FIG. 6B is a schematic plan view of the first configuration of the first die 100 in FIG. 6A.

In the second configuration, the frequency tuner 30 comprises an insulator layer 44 interposed between a first doped semiconductor portion 421 and a second doped semiconductor portion 422. The first doped semiconductor portion 421 and the second doped semiconductor portion 422 are spaced from each other by the insulator layer 44. The insulator layer 44 comprises a dielectric material such as silicon oxide or a dielectric metal oxide, and may have a thickness in a range from 1 nm to 6 nm, such as from 2 nm to 4 nm, although lesser and greater thicknesses may also be used. In one embodiment, the second doped semiconductor portion 422 is formed entirely above a horizontal plane including a topmost surface of the first doped semiconductor portion 421. In one embodiment, the MRR 40 may comprise a pair of intrinsic or lightly-doped semiconductor material portions 420 that is located outside the volume of the second segment 40B. The pair of intrinsic or lightly-doped semiconductor material portions 420 may be vertically spaced from each other by the insulator layer 44.

In the second configuration, the frequency tuner 30 comprises a first doped semiconductor portion 421 embodied as a first portion of the second segment 40B of the MRR 40 and having a doping a first conductivity type, and a second doped semiconductor portion 422 embodied as a second portion of the second segment 40B of the MRR 40 and having a doping of a second conductivity type that is an opposite of the first conductivity type. An electrical bias circuit 251 configured to apply an electrical bias voltage across the first doped semiconductor portion 421 and the second doped semiconductor portion 422 can be provided, for example, in the second die 200.

The operational principle of the quantum memory device in the second configuration can be similar to the operational principle of the quantum memory device in the first configuration. In the second configuration, the photon resonance frequency of the MRR 40 can be modulated by applying an electrical bias voltage across the first doped semiconductor portion 421 and the second doped semiconductor portion 422. Specifically, the electrical bias voltage modulates the effective refractive index within the second segment 40B of the MRR 40 by altering a charge carrier distribution within the second segment 40B of the MRR 40. Other than the frequency tuning mechanism, the second configuration of the quantum memory device can operate in the same manner as the quantum memory device of the first configuration described above.

Figure 7A:
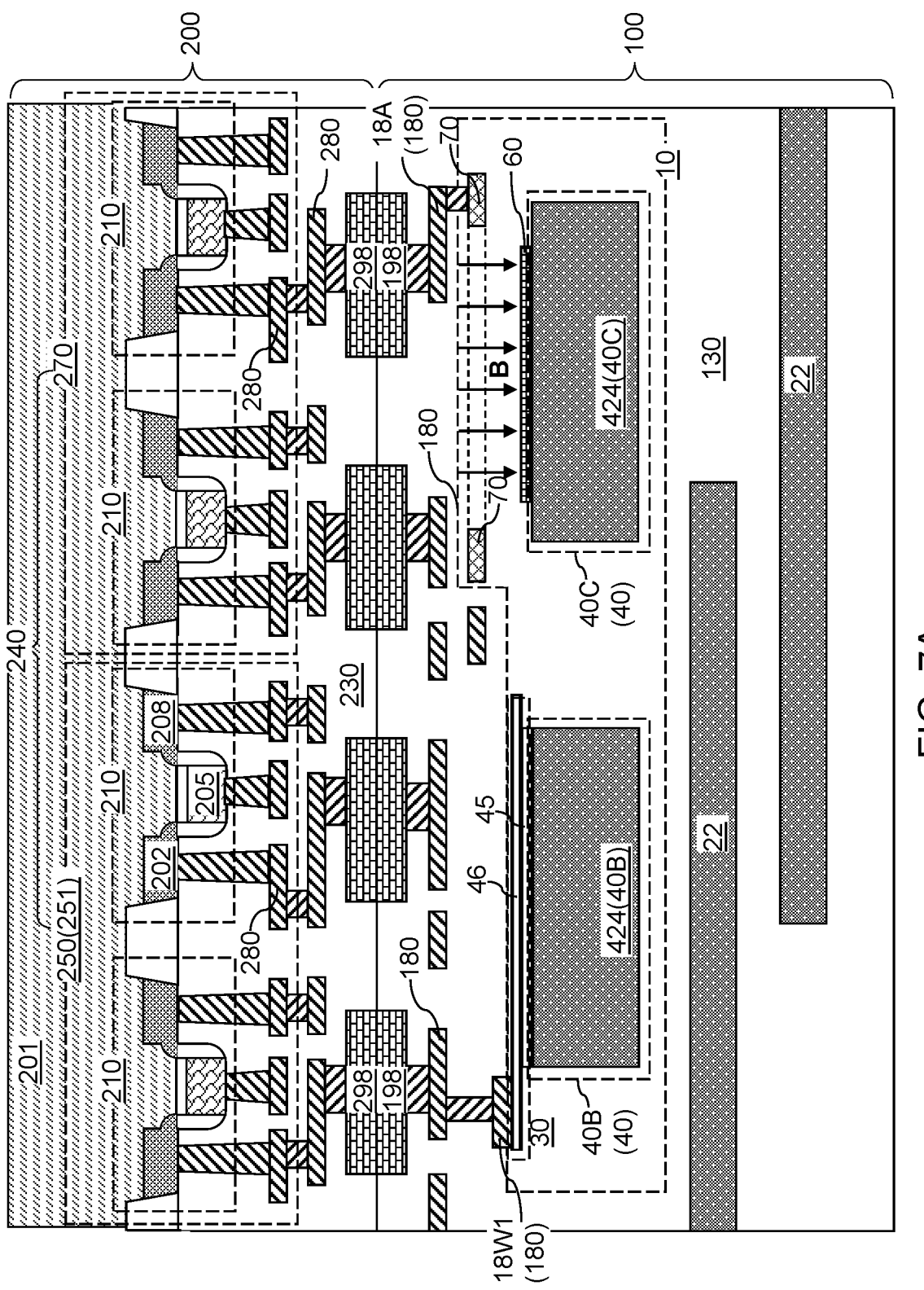
FIG. 7A is a magnified view of region M in FIG. 3 in embodiments in which the first die in the bonded assembly of FIG. 3 is in a third configuration.
Figure 7B:
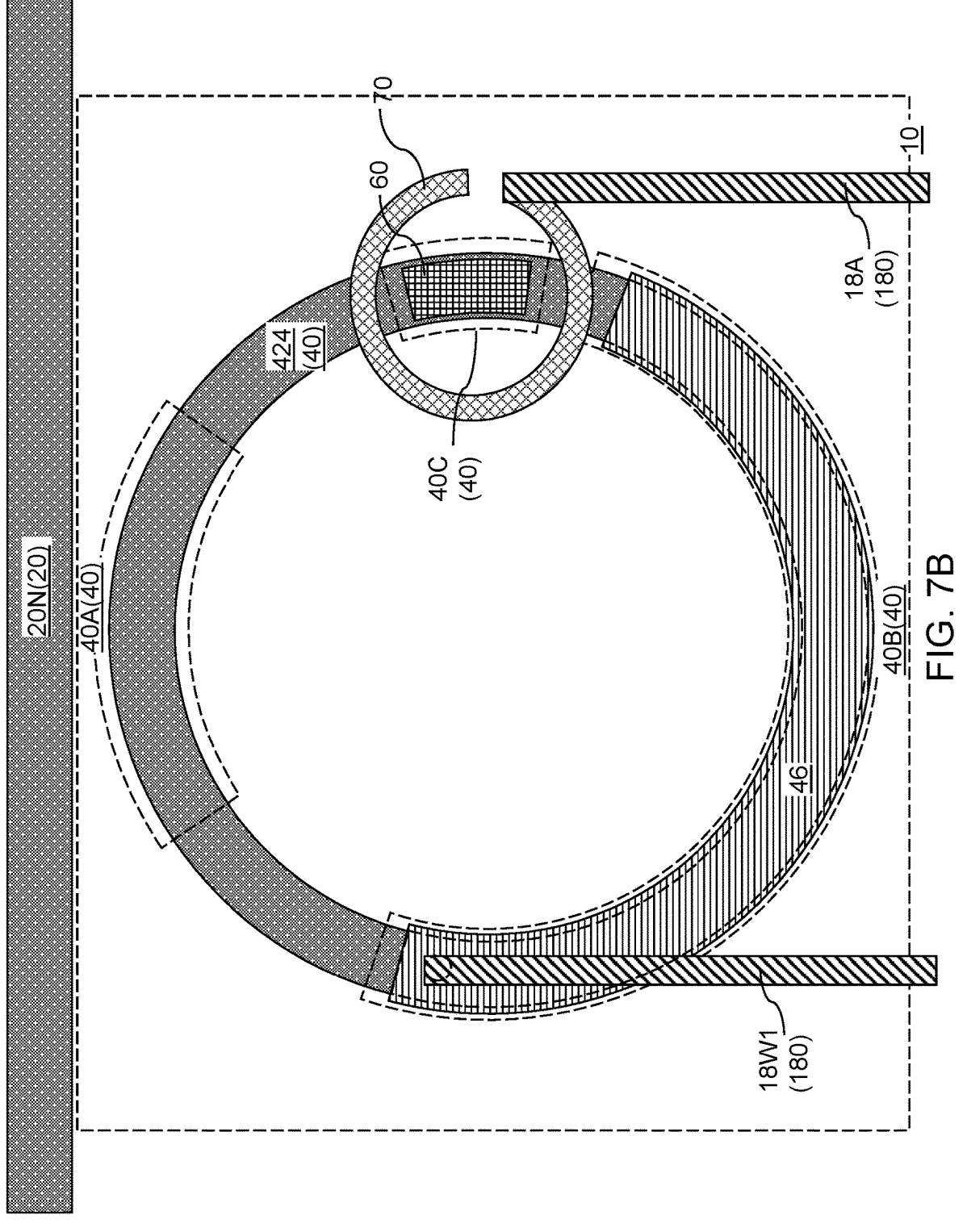
FIG. 7B is a schematic plan view of the first configuration of the first die in FIG. 7A.

FIGS. 7A and 7B illustrates a third configuration of the quantum memory device, which can be derived from the first configuration of the quantum memory device illustrated in FIGS. 3, 4A-4D, and 5 by using a silicon nitride waveguide 20N in lieu of a silicon waveguide 20S, by using silicon nitride for the MRR 40 in lieu of silicon, and by using a frequency tuner 30 that uses a two-dimensional cladding material that can change the refractive index upon application of an electrical bias voltage within each quantum memory cell 10. FIG. 7A is a magnified view of region M in FIG. 3 in embodiments in which the first die 100 in the bonded assembly of FIG. 3 is in a third configuration. FIG. 7B is a schematic plan view of the first configuration of the first die 100 in FIG. 7A.

The entirety of the MRR 40 in the third configuration may comprise silicon nitride. As such, the MRR 40 of the third configuration may comprise an annular silicon nitride ring 424, which may have a shape of an annular ring, an elongated annular ring, or an annular ring including one or more corner regions (i.e., regions having a lesser curvature in a top-down view compared to other regions). The lateral dimensions of and the heights of the silicon nitride waveguide 20N and the annular silicon nitride ring 424 may be increased compared to the lateral dimensions and the heights of the silicon waveguide 20S and the MRR 40 in the first and second configurations due to a lower refractive index of silicon nitride compared to semiconductor materials.

In one embodiment, the frequency tuner 30 may comprise a graphene electrode 46 that is formed over, on a side of, or under, the second segment 40B of the MRR 40. The graphene electrode 46 may directly contact a top surface, a sidewall, and/or a bottom surface of the MRR. Alternatively, an interfacial dielectric material layer 45 may be interposed between the MRR and the graphene electrode 46. The graphene electrode 46 can have a thickness in a range from 0.6 nm to 3 nm, such as from 1 nm to 2 nm, although lesser and greater thicknesses may also employed. Generally, a thin graphene layer is preferred for the graphene electrode 46 to maximize the change in the refractive index in the graphene electrode 46 upon application of an electrical bias voltage. The electrical bias voltage may be applied by the frequency tuner bias circuit 251. The electrical bias voltage may be a direct current bias voltage having a magnitude in a range from 0.5 V to 10 V, such as from 1 V to 3 V. The electrical bias circuit 251 configured to apply an electrical bias voltage to the graphene electrode 46 can be formed in the second die 200.

It should be noted that the graphene layer 46 is located directly on, or in proximity to, an outer surface of the MRR 40. As such, the wavefunction of photons in the MRR 40 has a spatial overlap with the volume of the graphene layer 46, and thus, a change in the refractive index in the graphene layer 46 results in the change in the resonant frequency of the MRR 40. Thus, the graphene layer 46 functions as a cladding material for the MRR 40, and a change in the refractive index in the graphene layer 46 results in a change in the effective refractive index of the MRR 40 as far as resonance frequency of the MRR 40 is concerned. Application of the bias voltage to the graphene layer 46 changes the spatial distribution of electrical charges in the graphene layer 46, and thus, changes the refractive index of the graphene layer 46.

The operational principle of the quantum memory device in the third configuration can be similar to the operational principle of the quantum memory device in the first configuration. In the third configuration, the photon resonance frequency is modulated by applying an electrical bias voltage across the graphene electrode 46 and the second segment 40B of the MRR 40. Specifically, a change in charge distribution in the graphene electrode 46 modules the effective refractive index around the second segment 40B of the MRR 40. Other than the frequency tuning mechanism, the second configuration of the quantum memory device can operate in the same manner as the quantum memory device of the first configuration described above.

Figure 8A:
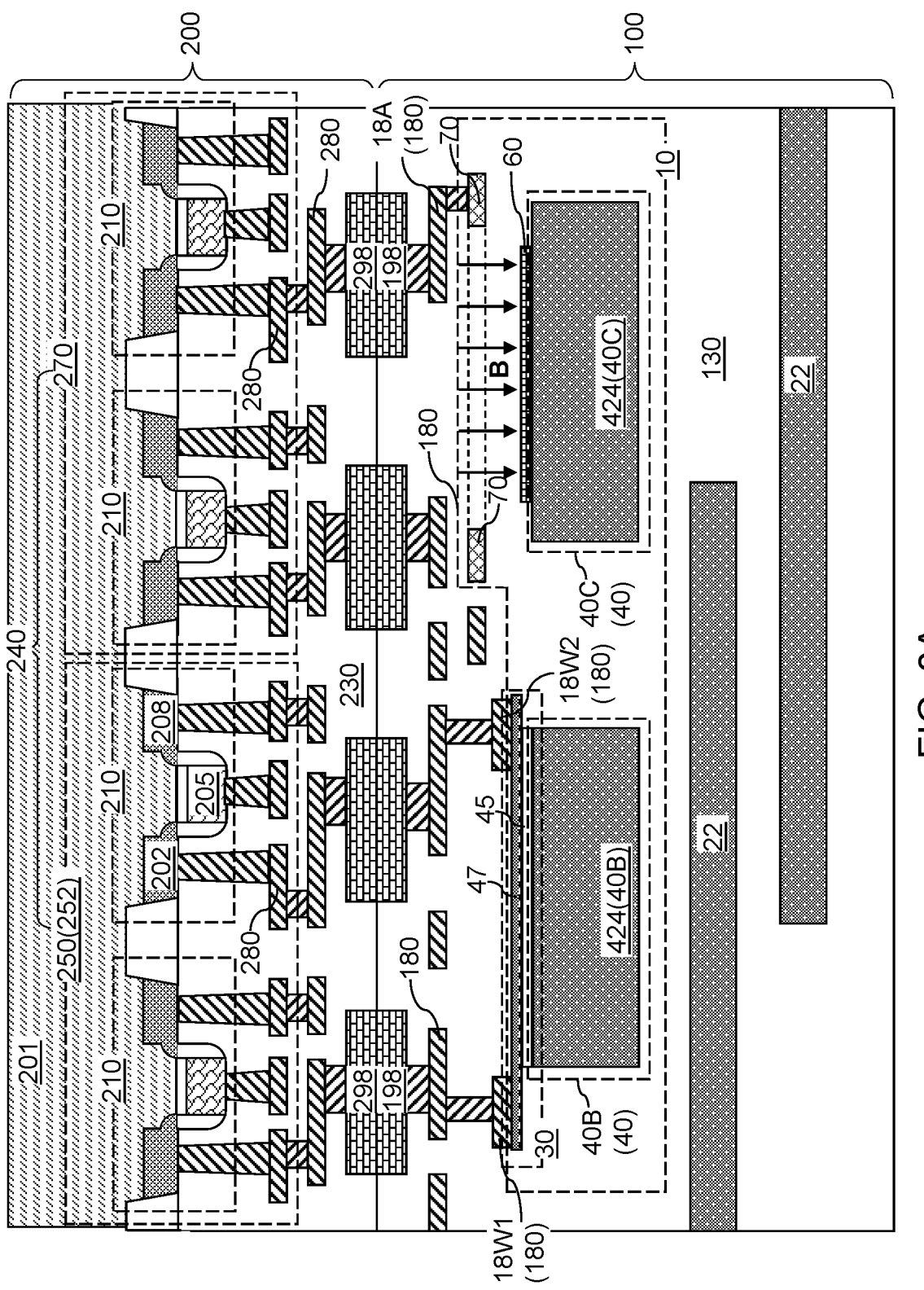
FIG. 8A is a magnified view of region M in FIG. 3 in embodiments in which the first die in the bonded assembly of FIG. 3 is in a fourth configuration.
Figure 8B:
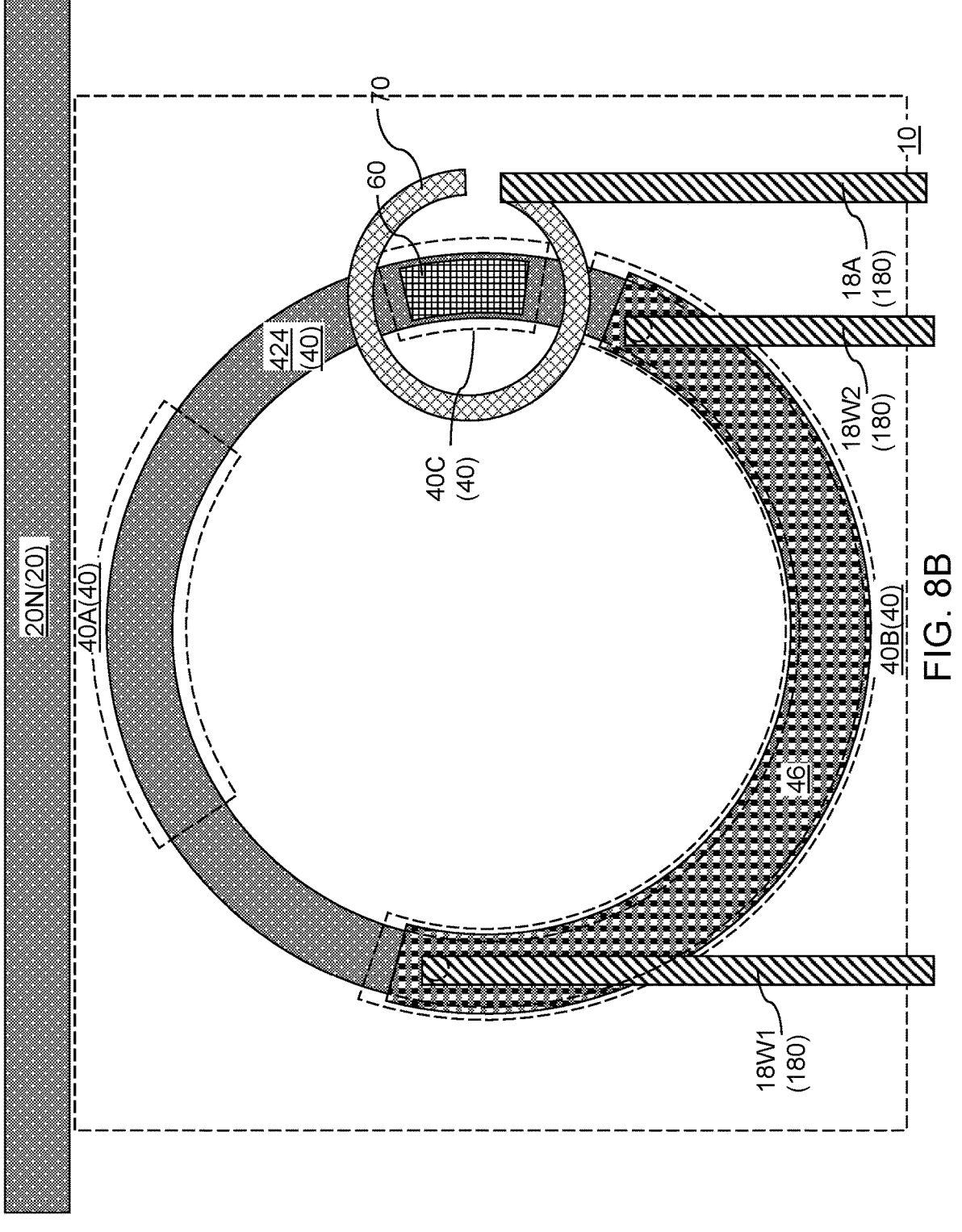
FIG. 8B is a schematic plan view of the first configuration of the first die in FIG. 8A.

FIGS. 8A and 8B illustrates a fourth configuration of the quantum memory device, which can be derived from the first configuration of the quantum memory device illustrated in FIGS. 3, 4A-4D, and 5, from the second configuration illustrated in FIGS. 3, 5, and 6A and 6B, or from the third configuration illustrated in FIGS. 3, 5, and 7A and 7B, by using a frequency tuner 30 that induces a change in the refractive index of the second segment 40B of the MRR 40 through temperature control, e.g., through application of heat. FIG. 8A is a magnified view of region M in FIG. 3 in embodiments in which the first die 100 in the bonded assembly of FIG. 3 is in a second configuration. FIG. 8B is a schematic plan view of the first configuration of the first die 100 in FIG. 8A.

In the fourth configuration, the frequency tuner 30 comprises a heater element 47 that is formed on the second segment 40B of the MRR 40. The heater element 47 may comprise a thin metal layer or a conductive metallic nitride layer including a conductive metallic nitride such as TIN, TaN, WN, or an aluminum-rich AlN alloy. The thickness of the heater element 47 may be in a range from 5 nm to 50 nm, such as from 10 nm to 25 nm, although lesser and greater thicknesses may also be used. The heater element 47 may be formed directly on a top surface, a sidewall, or a bottom surface, of the MRR 40. Alternatively, an interfacial dielectric material layer 45 may be interposed between the MRR and the heater element 47.

The frequency tuner control circuit 250 may comprise a temperature controller 252 configured to control a heat output of the heater element 47. The temperature controller 252 may be formed in a second die 200, and can be electrically connected to the heater element 47 upon bonding the second die 200 to the first die 200. The temperature controller 252 may comprise at least one field effect transistor 210.

The operational principle of the quantum memory device in the fourth configuration can be similar to the operational principle of the quantum memory device in the first configuration. In the fourth configuration, modulation of the effective refractive index of the second segment 40B of the MRR 40 can be achieved by changing the temperature of the second segment 40B of the MRR 40. Specifically, the photon resonance frequency is modulated by applying heat from the heater element 47 to the second segment 40B of the MRR 40. Other than the frequency tuning mechanism, the second configuration of the quantum memory device can operate in the same manner as the quantum memory device of the first configuration described above.

Figures 9, 10:
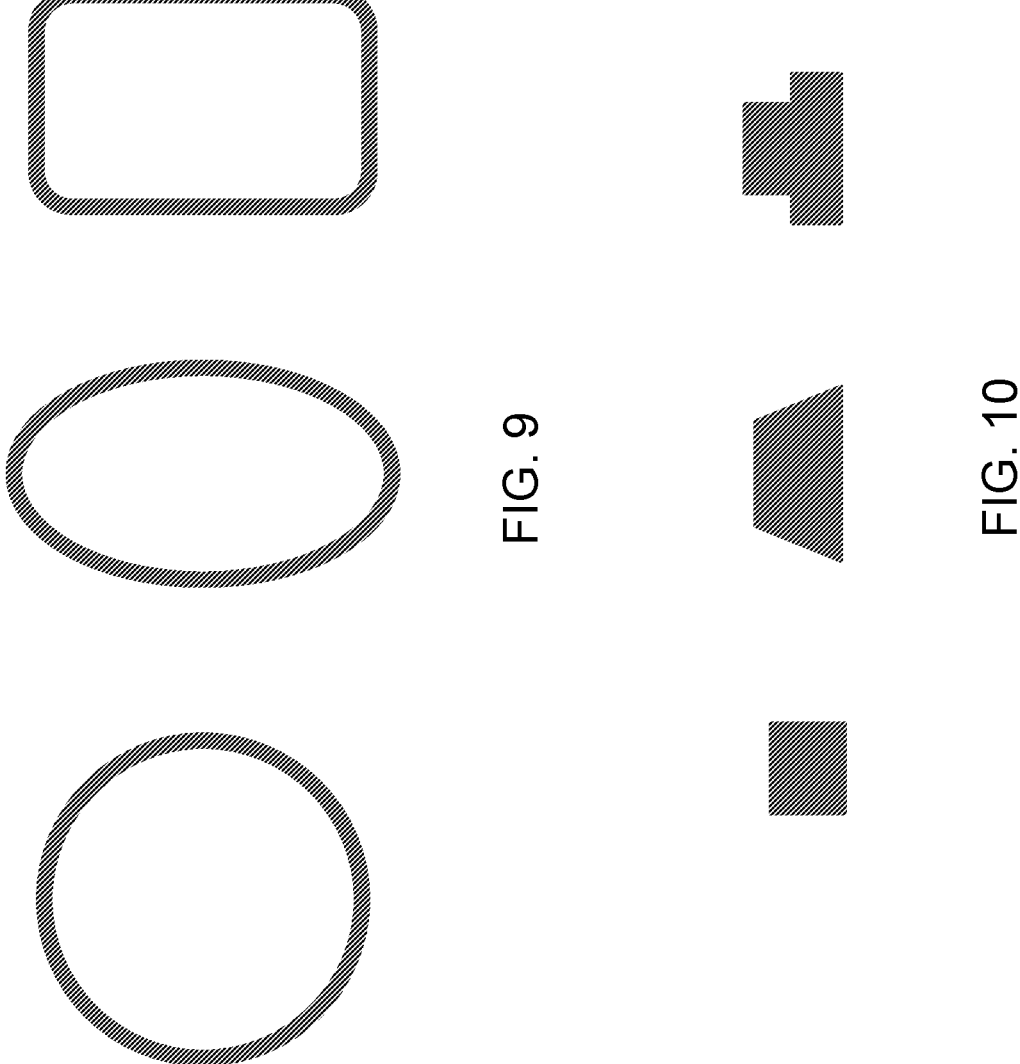
FIG. 9 are schematic top-down views of various configurations of a micro-ring resonator according to an embodiment of the present disclosure.
FIG. 10 are schematic vertical cross-sectional views of various configurations of a micro-ring resonator according to an embodiment of the present disclosure.

Referring to FIG. 9, various configurations of a micro-ring resonator (MRR) 40 according to embodiments of the present disclosure are illustrated in top-down views. The MRR 40 has a general shape of an annulus, i.e., a torus, and may be circular, may be elongated, or may have at least one corner having a lesser radius of curvature than surrounding regions in a top-down view. The effective circumference of the MRR 40 is determined by the equation $nC=m\lambda$, in which in the effective refractive index of the MRR 40, C is the effective circumference of the MRR 40, m is a non-negative integer (and is typically 1), and $\lambda$ is the photon resonance wavelength, i.e., the wavelength of photons to be captured as measured in vacuum.

Referring to FIG. 10, various configurations of the MRR 40 according to embodiments of the present disclosure are illustrated in top-down views. Various shapes can be used as the vertical cross-sectional shape of the MRR 40. The various shapes may include a rectangle, a rounded rectangle, a trapezoid, a tiered mesa structure, etc. The lateral dimensions and the heights of the various vertical cross-sectional shapes of the MRR 40 can be determined to optimize the lateral and vertical confinement of photons therein, and may be on par with the lateral dimensions and the heights of a waveguide 20 using the same material. In an illustrative example, the lateral dimensions and the heights of the various vertical cross-sectional shapes of the MRR 40 may be generally in a range from 200 nm to 600 nm, and may be adjusted depending on the wavelength of the photons to be captured and the refractive index of the material of the MRR 40.

Figure 11A:
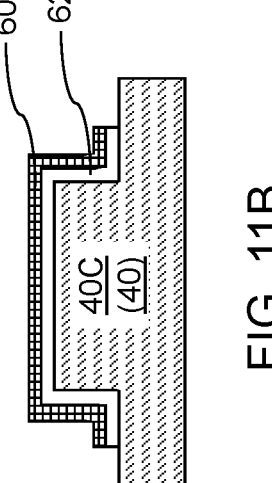
FIG. 11A is a vertical cross-sectional view of a first configuration of a quantum memory material portion according to an embodiment of the present disclosure.

Referring to FIG. 11A, a first configuration of a quantum memory material portion 60 according to an embodiment of the present disclosure is illustrated. In one embodiment, the quantum memory material portion 60 can be formed by deposition of a film of the quantum memory material directly on the material of the MRR 40. The quantum memory material portion 60 may be patterned, for example, using an etch mask layer and an etch process. The etch process can be selective to the material of the MRR 40, i.e., does not etch the material of the MRR 40 so that collateral damage to the MRR 40 is minimized.

Figure 11B:
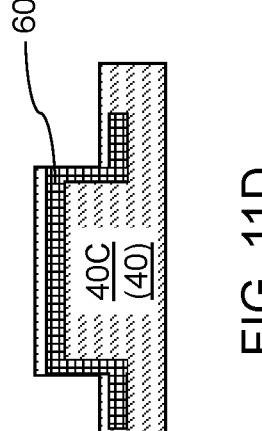
FIG. 11B is a vertical cross-sectional view of a second configuration of a quantum memory material portion according to an embodiment of the present disclosure.

Referring to FIG. 11B, a second configuration of a quantum memory material portion 60 according to an embodiment of the present disclosure is illustrated. In one embodiment, an insulating layer 62, which is an interfacial insulating layer 62, can be formed directly on the material of the MRR 40. The insulating layer 62 includes an insulating material such as silicon oxide, silicon nitride, or a dielectric metal oxide, and may have a thickness in a range from 1 nm to 20 nm, such as from 2 nm to 10 nm, although lesser and greater thicknesses may also be used. The quantum memory material portion 60 can be formed by deposition of a film of the quantum memory material over the insulating layer 62.

Figure 11C:
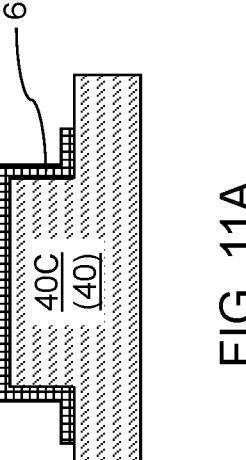
FIGS. 11C and 11D are sequential vertical cross-sectional views of a third configuration of a quantum memory material portion during manufacture according to an embodiment of the present disclosure.
Figure 11D:
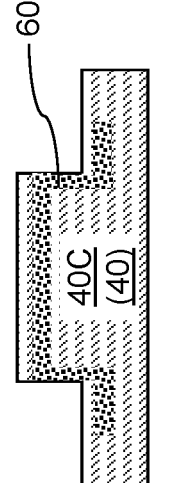

FIGS. 11C and 11D are sequential vertical cross-sectional views of a third configuration of a quantum memory material portion 60 during manufacture according to an embodiment of the present disclosure.

Referring to FIG. 11C, an implantation layer 60' can be formed in an upper portion of a third segment 40C of the MRR 40 by implantation of atoms of at least one element, which comprises the atomic elements of the quantum memory material portion 60 to be subsequently formed. For example, if the quantum memory material portion 60 to be formed comprises hexagonal boron nitride with nitrogen deficiency, atoms of the at least one element may comprise boron atoms in embodiments in which the MRR 40 comprises silicon nitride, or a combination of boron atoms and nitrogen atoms in embodiments in which the MRR 40 comprises silicon. In embodiments in which boron atoms and nitrogen atoms are implanted, the ratio of the doses of the boron atoms and the nitrogen atoms may be selected to ensure a suitable level of nitrogen deficiency is provided after an anneal process. In another example, if the quantum memory material portion 60 to be formed comprises molybdenum selenide, tungsten selenide, or aluminum nitride, the implanted species may comprise molybdenum, tungsten, aluminum, selenium, and/or nitrogen as needed for the final material composition of the quantum memory material portion 60.

Referring to FIG. 11D, a thermal anneal process can be performed to induce crystallization of the implanted atoms in the implantation layer 60'. The thermal anneal process that converts the atoms of the at least one element in the implantation layer 60' into a two-dimensional material. In one embodiment, more than 80% of atomic bonding may be within a two-dimensional plane (such as a plane that is parallel to a most proximal surface of the MRR 40).

Referring collectively to FIGS. 11A-11D, a quantum memory material portion 60 can be formed by introducing at least one material for forming the quantum memory material portion 60 within, or on, a third segment 40C of the MRR 40. The quantum memory material has a ground state and an excitation state that stores photons therein. In one embodiment, the quantum memory material comprises hexagonal boron nitride including nitrogen vacancy. In one embodiment, the quantum memory material comprises $MoSe_2$, $WSe_2$, or AlN. In one embodiment, the quantum memory material portion 60 comprises a film of the quantum memory material having a thickness that is less than 20%, and/or less than 10%, and/or less than 5%, and/or less than 2%, of a maximum lateral dimension of the film.

Referring collectively to FIGS. 1A-11D and according to various embodiments of the present disclosure, a quantum memory device is provided, which comprises: a waveguide 20 configured to spatially confine paths of photons therein; a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40; and a magnetic field generator (70, 270) configured to generate a magnetic field in the third segment 40C of the MRR 40 and in the quantum memory material portion 60.

In one embodiment, the magnetic field generator (70, 270) comprises a metallic structure 70 disposed over, or adjacent to, the third segment 40C of the waveguide 20, and a current switch circuit 270 comprising at least one field effect transistor 210 that is configured to switch electrical current that flows through the metallic structure 70. In one embodiment, the MRR 40 is embedded within first dielectric material layers 130 in a first die 100; and the current switch circuit 270 is located in a second die 200 that is bonded to the first die 100. In one embodiment, the first die 100 comprises first metal interconnect structures 180 and first metallic bonding pads 198 embedded within the first dielectric material layers 130; the second die 200 comprises second metal interconnect structures 280 and second metallic bonding pads 298 embedded within second dielectric material layers 230; and the second metallic bonding pads 298 are bonded to the first metallic bonding pads 198. In one embodiment, the metallic structure 70 comprises one of a coil structure, an antenna structure, and a transmission line structure.

In one embodiment, the quantum memory material portion 60 comprises a film of the quantum memory material having a thickness that is less than 20% of a maximum lateral dimension of the film; and the magnetic field generator (70, 270) is configured to generate the magnetic field such that an average of a vertical component of the magnetic field within a volume of the film has a magnitude that is at least 90% of a magnitude of an average of the magnetic field within the volume of the film.

In one embodiment, the quantum memory device comprises a control circuit 240 configured to modulate the photon resonance wavelength in the MRR 40 during a first step of a photon capture operation to match a predefined wavelength (which is a photon wavelength of photons in the waveguide 20) and to generate captured photons in the MRR 40. In one embodiment, the control circuit 240 is configured to generate the magnetic field during a second step of the photon capture operation using the magnetic field generator (70, 270) to increase quantum absorption of the captured photons by the quantum memory material.

According to another aspect of the present disclosure, a quantum memory device is provided, which comprises: a waveguide 20 configured to spatially confine paths of photons therein; a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40; a metallic structure 70 disposed over, or adjacent to, the third segment 40C of the waveguide 20 and configured to generate a magnetic field in the third segment 40C of the MRR 40 and in the quantum memory material portion 60 upon flowing of electrical current therethrough.

In one embodiment, the quantum memory device comprises a current switch circuit 270 comprising at least one field effect transistor 210 that is configured to switch electrical current that flows through the metallic structure 70. In one embodiment, the current switch circuit 270 and the metallic structure 70 are configured such that the magnetic field has a time-and-space averaged magnitude within a volume of the third segment 40C of the waveguide 20 in a range from 0.1 T to 5.0 T.

In one embodiment, the MRR 40 is embedded within first dielectric material layers 130 in a first die 100; and the current switch circuit 270 is located in a second die 200 that is bonded to the first die 100. In one embodiment, the first die 100 comprises first metal interconnect structures 180 and first metallic bonding pads 198 embedded within the first dielectric material layers 130; the second die 200 comprises second metal interconnect structures 280 and second metallic bonding pads 298 embedded within second dielectric material layers 230; and the second metallic bonding pads 298 are bonded to the first metallic bonding pads 198. In one embodiment, the metallic structure 70 comprises one of a coil structure, an antenna structure, and a transmission line structure.

According to yet another aspect of the present disclosure, a quantum memory device comprising a bonded assembly of a first die 100 and a second die 200 is provided. The first die 100 comprises: a waveguide 20 configured to spatially confine paths of photons therein; a micro-ring resonator (MRR) 40 comprising a first segment 40A that is parallel to a segment of the waveguide 20; a frequency tuner 30 configured to modulate a photon resonance frequency in the MRR 40 by modifying an effective refractive index within, or around, a second segment 40B of the MRR 40; a quantum memory material portion 60 including a quantum memory material having a ground state and an excitation state that stores photons therein and located within or on a third segment 40C of the MRR 40; and a metallic structure 70 disposed over, or adjacent to, the third segment 40C of the waveguide 20 and configured to generate a magnetic field in the third segment 40C of the MRR 40 and in the quantum memory material portion 60 upon flowing of electrical current therethrough. The second die 200 comprises a current switch circuit 270 comprising at least one field effect transistor 210 that is configured to switch electrical current that flows through the metallic structure 70.

In one embodiment, the first die 100 comprises first dielectric material layers 130 embedding the metallic structure 70, first metal interconnect structures 180, and first metallic bonding pads 198; and the second die 200 comprises second dielectric material layers 230 embedding second metal interconnect structures 280 and second metallic bonding pads 298; and the second metallic bonding pads 298 are bonded to the first metallic bonding pads 198. In one embodiment, the metallic structure 70 comprises one of a coil structure, an antenna structure, and a transmission line structure.

In one embodiment, the second die 200 comprises a control circuit 240 configured to modulate the photon resonance wavelength in the MRR 40 during a first step of a photon capture operation to match a predefined wavelength (which is a photon wavelength of photons in the waveguide 20) and to generate captured photons in the MRR 40. In one embodiment, the control circuit 240 is configured to generate the magnetic field during a second step of the photon capture operation using the magnetic field generator (70, 270) to increase quantum absorption of the captured photons by the quantum memory material. In one embodiment, the control circuit 240 is configured to generate the magnetic field during a first step of a photon release operation using the magnetic field generator (70, 270) to increases quantum coupling between energy stored in the quantum memory material and a resonant photon state within the MRR 40.

According to still another aspect of the present disclosure, a quantum memory device is provided, which comprises: a waveguide 20 configured to spatially confine paths of photons therein; a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40; and a control circuit 240 configured to generate captured photons in the MRR 40 from incident photons in the waveguide 20 and to induce a state transition from the ground state to the excitation state within the quantum memory material.

In one embodiment, the control circuit 240 is configured to induce quantum coupling between the captured photons and the state transition by applying a magnetic field to the third segment 40C of the MRR 40 and in the quantum memory material portion 60. In one embodiment, the quantum memory device comprises a metallic structure 70 disposed over, or adjacent to, the third segment 40C of the waveguide 20 and configured to generate the magnetic field in the third segment 40C of the MRR 40 and in the quantum memory material portion 60 upon flowing of electrical current therethrough. In one embodiment, the quantum memory device comprises a current switch circuit 270 comprising at least one field effect transistor 210 that is configured to switch electrical current that flows through the metallic structure 70. In one embodiment, the MRR 40 is embedded within first dielectric material layers 130 in a first die 100; and the current switch circuit 270 is located in a second die 200 that is bonded to the first die 100.

In one embodiment, the frequency tuner 30 comprises a first doped semiconductor portion 421 embodied as a first portion of the second segment 40B of the MRR 40 and having a doping a first conductivity type; and a second doped semiconductor portion 422 embodied as a second portion of the second segment 40B of the MRR 40 and having a doping of a second conductivity type that is an opposite of the first conductivity type. The quantum memory device may further comprise an electrical bias circuit 251 configured to apply an electrical bias voltage across the first doped semiconductor portion 421 and the second doped semiconductor portion 422.

In one embodiment, the first doped semiconductor portion 421 and the second doped semiconductor portion 422 are in direct contact with each other. In one embodiment, the frequency tuner 30 further comprises an insulator layer 44 interposed between the first doped semiconductor portion 421 and the second doped semiconductor portion 422. In one embodiment, a vertically-extending p-n junction is present between the first doped semiconductor portion 421 and the second doped semiconductor portion 422. In one embodiment, the second doped semiconductor portion 422 is located entirely above a horizontal plane including a top-most surface of the first doped semiconductor portion 421.

In one embodiment, the frequency tuner 30 comprises: a graphene electrode 46 located over, on a side of, or under, the second segment 40B of the MRR 40; and an electrical bias circuit 251 configured to apply an electrical bias voltage to the graphene electrode 46. In one embodiment, the MRR 40 comprises silicon nitride.

In one embodiment, the frequency tuner 30 comprises a heater element 47 located on the second segment 40B of the MRR 40; and the quantum memory device comprises a temperature controller 252 that is configured to control a heat output of the heater element 47.

According to even another aspect of the present disclosure, a quantum memory device is provided, which comprises: a one-dimensional array of waveguides 20 laterally extending along a first horizontal direction hd1; a two-dimensional array of quantum memory cells 10, wherein each of the quantum memory cells 10 comprises a micro-ring resonator (MRR) 40, a frequency tuner 30, and a quantum memory material portion 60, wherein the MRR 40 comprises a first segment 40A that is parallel to, and is optically coupled to, a respective waveguide 20 within the one-dimensional array of waveguides 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40; and word lines (18W1, 18W2) that are electrically connected to a respective row of frequency tuners 30 and configured to apply an electrical signal to modify photon resonance frequencies within a respective row of micro-ring resonators 40.

In one embodiment, each of the quantum memory cells 10 comprises a metallic structure 70 configured to generate a magnetic field in the third segment 40C of the MRR 40 and in the quantum memory material portion 60 within a respective quantum memory cell 10 upon flowing of an electrical current therethrough. In one embodiment, the quantum memory device comprises access lines 18A that are electrically connected to a respective row of metallic structures 70 and electrically connected to a respective current switch circuit 270 comprising at least one field effect transistor 210 that is configured to switch electrical current that flows through the respective row of metallic structures 70. In one embodiment, each of the metallic structures 70 comprises one of a coil structure, an antenna structure, and a transmission line structure.

FIG. 12 is a first flow chart that illustrates a sequence of processing steps that may be used to manufacture a quantum memory device according to an embodiment of the present disclosure.

Referring to step 1210 and FIGS. 1A-1C, 4A-10, a combination of a waveguide 20 and a micro-ring resonator (MRR) 40 can be formed. The waveguide 20 is configured to spatially confine paths of photons therein, and wherein the MRR 40 comprises a first segment 40A that is parallel to a segment of the waveguide 20.

Referring to step 1220 and FIGS. 1A-1C and 4A-8B, a frequency tuner 30 can be formed on the MRR 40. The frequency tuner 30 is configured to modulate a photon resonance frequency in the MRR 40 by modifying an effective refractive index within, or around, a second segment 40B of the MRR 40.

Referring to step 1230 and FIGS. 1A-1C, 4A-8B, and 11A-11D, a quantum memory material portion 60 can be formed, which includes a quantum memory material having a ground state and an excitation state that stores photons therein within or on a third segment 40C of the MRR 40.

In one embodiment, the method of manufacture further comprises forming a control circuit 240 configured to modulate the photon resonance wavelength in the MRR 40 during a first step of a photon capture operation to match a predefined wavelength (which is a photon wavelength of photons in the waveguide 20). In one embodiment, the method of manufacture further comprises forming a magnetic field generator (70, 270) configured to generate a magnetic field in the third segment 40C of the MRR 40 and in the quantum memory material portion 60.

FIG. 13 is a second flow chart that illustrates a sequence of processing steps that may be used to manufacture a quantum memory device according to an embodiment of the present disclosure.

Referring to step 1310 and FIGS. 1A-1C, 4A-10, a combination of a waveguide 20 and a micro-ring resonator (MRR) 40 can be formed. The waveguide 20 is configured to spatially confine paths of photons therein, and wherein the MRR 40 comprises a first segment 40A that is parallel to a segment of the waveguide 20.

Referring to step 1320 and FIGS. 1A-1C and 4A-8B, a frequency tuner 30 can be formed on the MRR 40. The frequency tuner 30 is configured to modulate a photon resonance frequency in the MRR 40 by modifying an effective refractive index within, or around, a second segment 40B of the MRR 40.

Referring to step 1330 and FIGS. 1A-1C, 4A-8B, and 11A-11D, a quantum memory material portion 60 can be formed, which includes a quantum memory material having a ground state and an excitation state that stores photons therein within or on a third segment 40C of the MRR 40.

Referring to step 1340 and FIGS. 2A, 2B, 3, and 4A-8B, a control circuit 240 can be formed, which is configured to generate captured photons in the MRR 40 from incident photons in the waveguide 20 and to induce a state transition from the ground state to the excitation state within the quantum memory material.

In one embodiment, the control circuit 240 is configured to induce quantum coupling between the captured photons and the state transition by applying a magnetic field to the third segment 40C of the MRR 40 and in the quantum memory material portion 60. In one embodiment, the method of manufacture further comprises forming a metallic structure 70 over the third segment 40C of the waveguide 20, wherein the metallic structure 70 is configured to generate the magnetic field in the third segment 40C of the MRR 40 and in the quantum memory material portion 60 upon flowing of electrical current therethrough. In one embodiment, the method of manufacture further comprises forming a current switch circuit 270 comprising at least one field effect transistor 210 that is configured to switch electrical current that flows through the metallic structure 70; and electrically connecting the current switch circuit 270 to the metallic structure 70. In one embodiment, the MRR 40 is formed within first dielectric material layers 130 in a first die 100; and the current switch circuit 270 is formed in a second die 200 that is different from the first die 100; and the method of manufacture comprises bonding the second die 200 to the first die 100.

In one embodiment, the frequency tuner 30 is formed by: forming a first doped semiconductor portion 421 in a first portion of the second segment 40B of the MRR 40, wherein the first doped semiconductor portion 421 has a doping a first conductivity type; and forming a second doped semiconductor portion 422 in a second portion of the second segment 40B of the MRR 40, wherein the second doped semiconductor portion 422 has a doping of a second conductivity type that is an opposite of the first conductivity type; and forming an electrical bias circuit 251 configured to apply an electrical bias voltage across the first doped semiconductor portion 421 and the second doped semiconductor portion 422. In one embodiment, the first doped semiconductor portion 421 and the second doped semiconductor portion 422 are in direct contact with each other. In one embodiment, the method of manufacture further comprises forming an insulator layer 44, wherein the first doped semiconductor portion 421 and the second doped semiconductor portion 422 are spaced from each other by the insulator layer 44. In one embodiment, a vertically-extending p-n junction is formed between the first doped semiconductor portion 421 and the second doped semiconductor portion 422. In one embodiment, the second doped semiconductor portion 422 is formed entirely above a horizontal plane including a topmost surface of the first doped semiconductor portion 421.

In one embodiment, the frequency tuner 30 is formed by: forming a graphene electrode 46 located over, on a side of, or under, the second segment 40B of the MRR 40; and forming an electrical bias circuit 251 configured to apply an electrical bias voltage to the graphene electrode 46. In one embodiment, the MRR 40 comprises silicon nitride.

In one embodiment, the frequency tuner 30 comprises a heater element 47 that is formed on the second segment 40B of the MRR 40; and the method of manufacture comprises forming a temperature controller 252 configured to control a heat output of the heater element 47.

FIG. 14 is a third flow chart that illustrates a sequence of processing steps that may be used to manufacture a quantum memory device according to an embodiment of the present disclosure.

Referring to step 1410 and FIGS. 1A-1C and 4A-8B, a one-dimensional array of waveguides 20 laterally extending along a first horizontal direction hd1 can be formed.

Referring to step 1420 and FIGS. 1A-1C and 4A-11D, a two-dimensional array of quantum memory cells 10 is formed. Each of the quantum memory cells 10 comprises a micro-ring resonator (MRR) 40, a frequency tuner 30, and a quantum memory material portion 60, wherein the MRR 40 comprises a first segment 40A that is parallel to, and is optically coupled to, a respective waveguide 20 within the one-dimensional array of waveguides 20. The frequency tuner 30 is configured to modulate a photon resonance frequency in the MRR 40 by modifying an effective refractive index within, or around, a second segment 40B of the MRR 40. The quantum memory material portion 60 includes a quantum memory material having a ground state and an excitation state that stores photons therein and formed within or on a third segment 40C of the MRR 40.

Referring to step 1430 and FIGS. 1A-1C and 4A-8B, word lines (18W1, 18W2) can be formed, which are electrically connected to a respective row of frequency tuners 30. The word lines (18W1, 18W2) are configured to apply an electrical signal to modify photon resonance frequencies within a respective row of micro-ring resonators 40.

In one embodiment, each of the quantum memory cells 10 comprises a metallic structure 70 that is configured to generate a magnetic field in the third segment 40C of the MRR 40 and in the quantum memory material portion 60 within a respective quantum memory cell 10 upon flowing of an electrical current therethrough. In one embodiment, the method of manufacture further comprises forming access lines 18A, wherein the access lines 18A are electrically connected to a respective row of metallic structures 70; forming current switch circuits 270 each comprising at least one field effect transistor 210 that is configured to switch electrical current; and electrically connecting each of the access lines 18A to a respective one of the current switch circuits 270.

In one embodiment, the one-dimensional array of waveguides 20, the two-dimensional array of quantum memory cells 10, and the word lines (18W1, 18W2) are formed in a first die 100; the method of manufacture further comprises forming a control circuit 240 configured to control operation of the word lines (18W1, 18W2) in a second die 200, the control circuit 240 comprising field effect transistors 210; and the method of manufacture comprises providing electrical connection between the control circuit 240 and the word lines (18W1, 18W2) by bonding the second die 200 to the first die 100.

According to even another aspect of the present disclosure, a method of operating a quantum memory device is provided. The quantum memory device comprises: a waveguide 20 configured to spatially confine paths of photons therein; and a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40. The method of operation comprises: transmitting photons having a photon wavelength through the waveguide 20; modulating a photon resonance wavelength in the MRR 40 to optically couple the MRR 40 to the photons in the waveguide 20 and to generate captured photons in the MRR 40; and transferring energy in the captured photons into the quantum memory material portion 60 by inducing absorption of the captured photons by the quantum memory material through transition from the ground state to the excited state in the quantum memory material, whereby a data bit is stored in the quantum memory material portion 60.

In one embodiment, the method of operation further comprises: generating confined photons in the MRR 40 by inducing transition from the excited state to the ground state in the quantum memory material; and inducing generation of a photon beam in the waveguide 20 by inducing optical coupling between the confined photons and the waveguide 20. In one embodiment, the memory cell 10 comprises a magnetic field generator (70, 270) configured to generate a magnetic field in the third segment 40C of the MRR 40 and in the quantum memory material portion 60; and transition from the ground state to the excited state in the quantum memory material is induced by generating a magnetic field in the quantum memory material portion 60 and the third segment 40C of the MRR 40.

FIG. 15 is a fourth flow chart that illustrates a sequence of processing steps that may be used to operate a quantum memory device according to an embodiment of the present disclosure.

Referring to step 1510 and FIGS. 1A-11D, a quantum memory device is provided, which comprises a waveguide 20 configured to spatially confine paths of photons therein; and a memory cell 10 that comprises a micro-ring resonator (MRR) 40, a frequency tuner 30, and a quantum memory material portion 60, wherein the MRR 40 comprises a first segment 40A that is parallel to a segment of the waveguide 20, wherein the frequency tuner 30 is configured to modulate a photon resonance frequency in the MRR 40 by modifying an effective refractive index within, or around, a second segment 40B of the MRR 40, and wherein the quantum memory material portion 60 includes a quantum memory material having a ground state and an excitation state that stores photons therein and located within or on a third segment 40C of the MRR 40.

Referring to step 1520 and FIGS. 4A-8D, photons having a photon wavelength can be transmitted through the waveguide 20.

Referring to step 1530 and FIGS. 4A-8D, captured photons can be generated in the MRR 40 by modulating a photon resonance wavelength in the MRR 40 to match the photon wavelength.

Referring to step 1540 and FIGS. 4A-8D, energy in the captured photons can be transferred into the quantum memory material portion 60 in a form of quantum excitation from the ground state to the excitation state.

In one embodiment, the energy in the captured photons is transferred into the quantum memory material portion 60 through quantum coupling between the captured photons and the quantum excitation by applying a magnetic field to the third segment 40C of the MRR 40 and the quantum memory material portion 60. In one embodiment, the quantum memory device comprises a metallic structure 70 disposed over, or adjacent to, the third segment 40C of the waveguide 20; and the method of operation comprises generating the magnetic field in the third segment 40C of the MRR 40 and in the quantum memory material portion 60 by flowing electrical current through the metallic structure 70.

In one embodiment, the quantum memory device comprises a current switch circuit 270 including at least one field effect transistor 210; and the method of operation comprises switching electrical current that flows through the metallic structure 70 using the current switch circuit 270 such that the magnetic field is turned on while the electrical current flows through the metallic structure 70, and the magnetic field is turned off while the electrical current does not flow through the metallic structure 70. In one embodiment, the MRR 40 is embedded within first dielectric material layers 130 in a first die 100; and the current switch circuit 270 is located in a second die 200 that is bonded to the first die 100. In one embodiment, the metallic structure 70 comprises one of a coil structure, an antenna structure, and a transmission line structure.

In one embodiment, the frequency tuner 30 comprises a first doped semiconductor portion 421 embodied as a first portion of the second segment 40B of the MRR 40 and having a doping a first conductivity type, and a second doped semiconductor portion 422 embodied as a second portion of the second segment 40B of the MRR 40 and having a doping of a second conductivity type that is an opposite of the first conductivity type; and the photon resonance frequency is modulated by applying an electrical bias voltage across the first doped semiconductor portion 421 and the second doped semiconductor portion 422. In one embodiment, the electrical bias voltage modulates the effective refractive index within the second segment 40B of the MRR 40 by altering a charge carrier distribution within the second segment 40B of the MRR 40. In one embodiment, the frequency tuner 30 comprises a p-n junction between the first doped semiconductor portion 421 and the second doped semiconductor portion 422; and the electrical bias voltage modulates a width of a depletion zone across the p-n junction. In one embodiment, the frequency tuner 30 further comprises an insulator layer 44 interposed between the first doped semiconductor portion 421 and the second doped semiconductor portion 422.

In one embodiment, the frequency tuner 30 comprises a graphene electrode 46 located over, on a side of, or under, the second segment 40B of the MRR 40; and the photon resonance frequency is modulated by applying an electrical bias voltage across the graphene electrode 46 and the second segment 40B of the MRR 40, wherein a change in charge distribution in the graphene electrode 46 modules the effective refractive index around the second segment 40B of the MRR 40. In one embodiment, the MRR 40 comprises silicon nitride.

In one embodiment, the frequency tuner 30 comprises a heater element 47 located on the second segment 40B of the MRR 40; and the method of operation comprises modulating the effective refractive index of the second segment 40B of the MRR 40 by changing a temperature of the second segment 40B of the MRR 40.

FIG. 16 is a fifth flow chart that illustrates a sequence of processing steps that may be used to operate a quantum memory device according to an embodiment of the present disclosure.

Referring to step 1610 and FIGS. 1A-11D, a quantum memory device is provided, which includes: a one-dimensional array of waveguides 20 laterally extending along a first horizontal direction hd1, a two-dimensional array of quantum memory cells 10, wherein each of the quantum memory cells 10 comprises a micro-ring resonator (MRR) 40, a frequency tuner 30, and a quantum memory material portion 60, wherein the MRR 40 comprises a first segment 40A that is parallel to, and is optically coupled to, a respective waveguide 20 within the one-dimensional array of waveguides 20, wherein the frequency tuner 30 is configured to modulate a photon resonance frequency in the MRR 40, and wherein the quantum memory material portion 60 includes a quantum memory material having a ground state and an excitation state that stores photons therein and located within or on a third segment 40C of the MRR 40, and word lines (18W1, 18W2) that are electrically connected to a respective row of frequency tuners 30.

Referring to step 1620 and FIGS. 4A-8B, photons having a photon wavelength can be transmitted through a waveguide 20 that is optically coupled to a selected quantum memory cell 10 within the two-dimensional array of quantum memory cells 10.

Referring to step 1630 and FIGS. 4A-8B, captured photons can be generated in the MRR 40 of the selected quantum memory cell 10 by modulating a photon resonance wavelength in the MRR 40 of the selected quantum memory cell 10 to match the photon wavelength.

Referring to step 1640 and FIGS. 4A-8B, energy in the captured photons can be transferred into the quantum memory material portion 60 of the selected quantum memory cell 10 in a form of quantum excitation.

In one embodiment, each of the quantum memory cells 10 comprises a metallic structure 70 configured to generate a magnetic field in the third segment 40C of the MRR 40 and in the quantum memory material portion 60 within a respective quantum memory cell 10 upon flowing of an electrical current therethrough; and the method of operation comprises inducing quantum coupling between the captured photons and the quantum excitation in the quantum memory material portion 60 of the selected quantum memory cell 10 by applying a magnetic field to the third segment 40C of the MRR 40 and the quantum memory material portion 60 of the selected quantum memory cell 10. In one embodiment, the three-dimensional quantum memory device comprises access lines 18A that are electrically connected to a respective row of metallic structures 70 and electrically connected to a respective current switch circuit 270 comprising at least one field effect transistor 210; and the method of operation comprises generating the magnetic field by turning on a current switch circuit 270 that is connected to the access line that is connected to the metallic structure 70 in the selected quantum memory cell 10.

In one embodiment, the two-dimensional quantum memory array is provided a first die 100; the quantum memory device comprises a control circuit 240 located in a second die 200 and configured to control operation of the two-dimensional array of quantum memory cells 10 and the word lines (18W1, 18W2); and the second die 200 is bonded to the first die 100.

FIG. 17 is a sixth flow chart that illustrates a sequence of processing steps that may be used to manufacture a quantum memory device according to an embodiment of the present disclosure.

Referring to step 1710 and FIGS. 1A-1C and 4A-10, a combination of a waveguide 20 and a micro-ring resonator (MRR) 40 can be formed. The waveguide 20 is configured to spatially confine paths of photons therein, and wherein the MRR 40 comprises a first segment 40A that is parallel to a segment of the waveguide 20.

Referring to step 1720 FIGS. 1A-1C and 4A-8B, a frequency tuner 30 can be formed on the MRR 40. The frequency tuner 30 is configured to modulate a photon resonance frequency in the MRR 40 by modifying an effective refractive index within, or around, a second segment 40B of the MRR 40.

Referring to step 1730 FIGS. 1A-1C, 4A-8B, and 11A-11D, a quantum memory material portion 60 can be formed, which includes a quantum memory material having a ground state and an excitation state that stores photons therein, by introducing at least one material for forming the quantum memory material portion 60 within, or on, a third segment 40C of the MRR 40.

In one embodiment, the quantum memory material comprises hexagonal boron nitride including nitrogen vacancy. In one embodiment, the quantum memory material comprises $MoSe_2$, $WSe_2$, or AlN. In one embodiment, the quantum memory material portion 60 comprises a film of the quantum memory material having a thickness that is less than 20% of a maximum lateral dimension of the film.

In one embodiment, the quantum memory material portion 60 is formed by implantation of atoms of at least one element and a subsequent thermal anneal process that forms converts the atoms of the at least one element into a two-dimensional material in which more than 80% of atomic bonding is within a two-dimensional plane. In one embodiment, the at least one element comprises boron and nitrogen, and the quantum memory material comprises hexagonal boron nitride.

In one embodiment, the quantum memory material portion 60 is formed by deposition of a film of the quantum memory material directly on a material of the MRR 40. In one embodiment, the quantum memory material portion 60 is formed by deposition of a film of the quantum memory material over an insulating layer that is formed directly on a material of the MRR 40.

In one embodiment, the method of manufacture further comprises forming a magnetic field generator (70, 270) that is configured to generate a magnetic field such that an average of a vertical component of the magnetic field within a volume of the quantum memory material portion 60 has a magnitude that is at least 90% of a magnitude of an average of the magnetic field within the volume of the quantum memory material portion 60. In one embodiment, the magnetic field generator (70, 270) comprises: a metallic structure 70 is formed within first dielectric material layers 130 that embeds the MRR 40; and a current switch circuit 270 comprising at least one field effect transistor 210 that is configured to switch electrical current that flows through the metallic structure 70. In one embodiment, the waveguide 20, the MRR 40, the metallic structure 70, and the first dielectric material layers 130 are formed in a first die 100; the method of manufacture comprises forming first metallic bonding pads 198 in the first die 100; the current switch circuit 270 is formed within a second die 200 including second metallic bonding pads 298; and the method of manufacture comprises bonding the second metallic bonding pads 298 to the first metallic bonding pads 198.

In one embodiment, the method of manufacture comprises forming a control circuit 240 configured to generate captured photons in the MRR 40 from incident photons in the waveguide 20 and to induce a state transition from the ground state to the excitation state within the quantum memory material. In one embodiment, the waveguide 20 and the MRR 40 are formed in a first die 100; the method of manufacture comprises forming first metallic bonding pads 198 in the first die 100; the control circuit 240 is formed within a second die 200 including second metallic bonding pads 298; and the method of manufacture comprises bonding the second metallic bonding pads 298 to the first metallic bonding pads 198.

FIG. 18 is a seventh flow chart that illustrates a sequence of processing steps that may be used to manufacture a quantum memory device according to an embodiment of the present disclosure.

Referring to step 1810 and FIGS. 1A-1C and 4A-10, a one-dimensional array of waveguides 20 laterally extending along a first horizontal direction hd1 can be formed.

Referring to step 1820 and FIGS. 1A-1C and 4A-11D, a two-dimensional array of quantum memory cells 10 can be formed. Each of the quantum memory cells 10 comprises a micro-ring resonator (MRR) 40, a frequency tuner 30, and a quantum memory material portion 60, wherein the MRR 40 comprises a first segment 40A that is parallel to, and is optically coupled to, a respective waveguide 20 within the one-dimensional array of waveguides 20. The frequency tuner 30 is configured to modulate a photon resonance frequency in the MRR 40 by modifying an effective refractive index within, or around, a second segment 40B of the MRR 40. The quantum memory material portion 60 includes a quantum memory material having a ground state and an excitation state that stores photons therein and formed within or on a third segment 40C of the MRR 40 by introducing at least one material for forming the quantum memory material portion 60 within, or on, a third segment 40C of the MRR 40.

In one embodiment, the quantum memory material portion 60 is formed by implantation of atoms of at least one element and a subsequent thermal anneal process that forms converts the atoms of the at least one element into a two-dimensional material in which more than 80% of atomic bonding is within a two-dimensional plane. In one embodiment, the quantum memory material portion 60 is formed by deposition of a film of the quantum memory material directly on a material of the MRR 40. In one embodiment, the quantum memory material portion 60 is formed by deposition of a film of the quantum memory material over an insulating layer that is formed directly on a material of the MRR 40.

In one embodiment, the method of manufacture further comprises forming word lines (18W1, 18W2) that are electrically connected to a respective row of frequency tuners 30, wherein the word lines (18W1, 18W2) are configured to apply an electrical signal to modify photon resonance frequencies within a respective row of micro-ring resonators 40. In one embodiment, the method of manufacture further comprises forming access lines 18A, wherein the access lines 18A are electrically connected to a respective row of metallic structures 70, wherein each of the metallic structures 70 is configured to generate a magnetic field in the quantum memory material portion 60 of a respective one of the quantum memory cells 10; forming current switch circuits 270 each comprising at least one field effect transistor 210 that is configured to switch electrical current; and electrically connecting each of the access lines 18A to a respective one of the current switch circuits 270.

FIG. 19 is an eighth flow chart that illustrates a sequence of processing steps that may be used to manufacture a quantum memory device according to an embodiment of the present disclosure.

Referring to step 1910 and FIGS. 1A-1C and 4A-11D, a first die 100 can be formed. The first die 100 comprises a one-dimensional array of waveguides 20 laterally extending along a first horizontal direction hd1, a two-dimensional array of quantum memory cells 10, and word lines (18W1, 18W2), wherein each of the quantum memory cells 10 comprises a micro-ring resonator (MRR) 40, a frequency tuner 30, and a quantum memory material portion 60. The MRR 40 comprises a first segment 40A that is parallel to, and is optically coupled to, a respective waveguide 20 within the one-dimensional array of waveguides 20. The frequency tuner 30 is configured to modulate a photon resonance frequency in the MRR 40 by modifying an effective refractive index within, or around, a second segment 40B of the MRR 40. The quantum memory material portion 60 includes a quantum memory material having a ground state and an excitation state that stores photons therein and formed within or on a third segment 40C of the MRR 40 by introducing at least one material for forming the quantum memory material portion 60 within, or on, a third segment 40C of the MRR 40. The word lines (18W1, 18W2) are electrically connected to a respective row of frequency tuners 30, wherein the word lines (18W1, 18W2) are configured to apply an electrical signal to modify photon resonance frequencies within a respective row of micro-ring resonators 40.

Referring to step 1920 and FIGS. 2A and 2B and FIGS. 4A-8B, a second die 200 can be formed, which comprises a control circuit 240 configured to control operation of the word lines (18W1, 18W2). The control circuit 240 comprises field effect transistors 210.

Referring to step 1930 and FIGS. 3-8B, electrical connection between the control circuit 240 and the word lines (18W1, 18W2) can be provided by bonding the second die 200 to the first die 100.

The various embodiments of the present disclosure may be used to provide a solid state quantum memory device that can capture photons and release photons, thereby functioning as a memory device that can store information during photonic device operations. The solid state quantum memory device of the present disclosure does not use a cryogenic environment or vacuum environment, and may be integrated into a semiconductor package for integration with semiconductor devices.

The foregoing outlines features of several embodiments so that those skilled in the art may better understand the aspects of the present disclosure. Each embodiment described using the term "comprises" also inherently discloses additional embodiments in which the term "comprises" is replaced with "consists essentially of" or with the term "consists of," unless expressly disclosed otherwise herein. Whenever two or more elements are listed as alternatives in a same paragraph of in different paragraphs, a Markush group including a listing of the two or more elements is also impliedly disclosed. Whenever the auxiliary verb "can" is used in this disclosure to describe formation of an element or performance of a processing step, an embodiment in which such an element or such a processing step is not performed is also expressly contemplated, provided that the resulting apparatus or device can provide an equivalent result. As such, the auxiliary verb "can" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A quantum memory device comprising:
   a waveguide configured to spatially confine paths of photons therein;
   a memory cell that comprises a micro-ring resonator (MRR), a frequency tuner, and a quantum memory material portion, wherein the MRR comprises a first segment that is parallel to a segment of the waveguide, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and located within or on a third segment of the MRR; and a control circuit configured to modulate a photon resonance wavelength in the MRR during a first step of a photon capture operation to match a predefined wavelength, and to generate captured photons in the MRR, the predefined wavelength being a wavelength of the captured photons.

2. The quantum memory device of claim 1, further comprising a magnetic field generator configured to generate a magnetic field in the third segment of the MRR and in the quantum memory material portion.

3. The quantum memory device of claim 2, wherein the control circuit is configured to generate the magnetic field during a second step of the photon capture operation to increase quantum absorption of photons captured by the quantum memory material.

4. The quantum memory device of claim 2, wherein:

the MRR is embedded within first dielectric material layers in a first die; and the magnetic field generator comprises a metallic structure embedded within the first dielectric material layers, and a current switch circuit comprising at least one field effect transistor that is configured to switch electrical current that flows through the metallic structure.

5. The quantum memory device of claim 4, wherein:

the first die that comprises first metallic bonding pads; and the current switch circuit is located within a second die including second metallic bonding pads that are bonded to the first metallic bonding pads.

6. The quantum memory device of claim 5, wherein the metallic structure is electrically connected to the current switch circuit by a subset of first metal interconnect structures embedded within the first dielectric material layers, a subset of the first metallic bonding pads, a subset of the second metallic bonding pads, and a subset of second metal interconnect structures embedded within second dielectric material layers that are located within the second die.

7. The quantum memory device of claim 1, wherein:

the MRR is embedded within first dielectric material layers in a first die; and a current switch circuit is located within a second die including second metallic bonding pads that are bonded to the first metallic bonding pads.

8. The quantum memory device of claim 1, wherein the quantum memory material portion is located directly on a surface of the third segment of the MRR.

9. The quantum memory device of claim 1, wherein the quantum memory material portion is embedded within the third segment of the MRR.

10. The quantum memory device of claim 1, wherein the quantum memory material portion is in contact with a dielectric spacer layer that is located on a surface of the third segment of the MRR.

11. The quantum memory device of claim 1, wherein:

the frequency tuner comprises a first doped semiconductor portion embodied as a first portion of the second segment of the MRR and having a doping of a first conductivity type, and a second doped semiconductor portion embodied as a second portion of the second segment of the MRR and having a doping of a second conductivity type that is an opposite of the first conductivity type; and the quantum memory device comprises an electrical bias circuit that is configured to apply an electrical bias voltage across the first doped semiconductor portion and the second doped semiconductor portion.

12. The quantum memory device of claim 1, wherein the frequency tuner comprises:

a graphene electrode located over, on a side of, or under, the second segment of the MRR; and an electrical bias circuit configured to apply an electrical bias voltage to the graphene electrode.

13. The quantum memory device of claim 1, wherein:

the frequency tuner comprises a heater element located on the second segment of the MRR; and the quantum memory device comprises a temperature controller that is configured to control a heat output of the heater element.

14. The quantum memory device of claim 1, wherein:

the quantum memory device comprises a two-dimensional memory array including the memory cell and additional memory cells;

the two-dimensional memory array comprises a plurality of waveguides that laterally extend along a first horizontal direction, the plurality of waveguides including the waveguide; and the two-dimensional memory array comprises a plurality of word lines that are connected to a respective frequency tuner within a respective memory cell within the two-dimensional memory array and laterally extending along a second horizontal direction.

15. A quantum memory device comprising:

a bonded assembly of a first die and a second die, wherein the first die comprises:

a waveguide configured to spatially confine paths of photons therein;

a micro-ring resonator (MRR) comprising a first segment that is parallel to a segment of the waveguide;

a frequency tuner configured to modulate a photon resonance frequency in the MRR by modifying an effective refractive index within, or around, a second segment of the MRR; and a quantum memory material portion including a quantum memory material having a ground state and an excitation state that stores photons therein and located within or on a third segment of the MRR; and wherein the second die comprises a control circuit configured to modulate a photon resonance wavelength in the MRR during a first step of a photon capture operation to match a predefined wavelength, and to generate captured photons in the MRR.

16. The quantum memory device of claim 15, wherein:

the first die comprises first dielectric material layers embedding first metal interconnect structures and first metallic bonding pads; and the second die comprises second dielectric material layers embedding second metal interconnect structures and second metallic bonding pads that are bonded to the first metallic bonding pads.

17. The quantum memory device of claim 16, further comprising a magnetic field generator configured to generate a magnetic field in the third segment of the MRR and in the quantum memory material portion, wherein the magnetic field generator comprises:

a metallic structure embedded within the first dielectric material layers in the first die; and a current switch circuit located in the second die and comprising at least one field effect transistor that is configured to switch electrical current that flows through the metallic structure.

18. A quantum memory device comprising:

a waveguide configured to spatially confine paths of photons therein;

a memory cell that comprises a micro-ring resonator (MRR), a frequency tuner, and a quantum memory material portion, wherein the MRR comprises a first segment that is parallel to a segment of the waveguide, wherein the frequency tuner is configured to modulate a photon resonance frequency in the MRR by modifying an effective refractive index within, or around, a second segment of the MRR, and wherein the quantum memory material portion includes a quantum memory material having a ground state and an excitation state that stores photons therein and located within or on a third segment of the MRR;

a control circuit configured to modulate the photon resonance wavelength in the MRR during a first step of a photon capture operation; and a magnetic field generator configured to generate a magnetic field in the third segment of the MRR and in the quantum memory material portion in a second step of the photon capture operation.

19. The quantum memory device of claim 18, wherein the magnetic field generator comprises a metallic structure disposed over, or adjacent to, the third segment of the waveguide, and a current switch circuit comprising at least one field effect transistor that is configured to switch electrical current that flows through the metallic structure.

20. The quantum memory device of claim 19, wherein:

the MRR is embedded within first dielectric material layers in a first die; and the current switch circuit is located in a second die that is bonded to the first die.

* * * * *